United States Patent
Hayakawa

(10) Patent No.: US 12,179,510 B2
(45) Date of Patent: Dec. 31, 2024

(54) FRICTION BODY UNIT AND THERMOCHROMIC WRITING INSTRUMENT

(71) Applicant: Kabushiki Kaisha Pilot Corporation, Tokyo (JP)

(72) Inventor: Hisatoshi Hayakawa, Tokyo (JP)

(73) Assignee: Kabushiki Kaisha Pilot Corporation, Tokyo (JP)

(*) Notice: Subject to any disclaimer, the term of this patent is extended or adjusted under 35 U.S.C. 154(b) by 0 days.

(21) Appl. No.: 18/280,984

(22) PCT Filed: Mar. 2, 2022

(86) PCT No.: PCT/JP2022/008753
§ 371 (c)(1),
(2) Date: Sep. 8, 2023

(87) PCT Pub. No.: WO2022/190974
PCT Pub. Date: Sep. 15, 2022

(65) Prior Publication Data
US 2024/0149605 A1 May 9, 2024

(30) Foreign Application Priority Data

Mar. 9, 2021 (JP) .................................. 2021-036876
Apr. 29, 2021 (JP) .................................. 2021-076905

(51) Int. Cl.
*B43K 29/02* (2006.01)
*B43K 23/12* (2006.01)
*C09D 11/50* (2014.01)

(52) U.S. Cl.
CPC .............. *B43K 29/02* (2013.01); *B43K 23/12* (2013.01); *C09D 11/50* (2013.01)

(58) Field of Classification Search
CPC ...... B43K 29/02; B43K 29/00; B43K 29/007; B43K 29/013; B43K 29/04; B43K 29/05; C09D 11/50
(Continued)

(56) References Cited

U.S. PATENT DOCUMENTS 703,229 A * 6/1902 Boman
2,205,929 A * 6/1940 Musgrave .............. B43K 29/02
16/108

(Continued)

FOREIGN PATENT DOCUMENTS

JP H727888 U 5/1995
JP 2013188922 A 9/2013
(Continued)

*Primary Examiner* — David J Walczak
(74) *Attorney, Agent, or Firm* — The Webb Law Firm

(57) ABSTRACT

A friction unit includes a friction piece and a retention portion, the friction piece being configured to allow generation of frictional heat to cause handwriting in thermochromic ink to undergo a thermochromic change and the retention portion being configured to allow retention of the friction piece and attachment to and detachment from a barrel or cap of a thermochromic writing instrument. The retention portion has a tubular side wall forming an internal space opening at least downward, the side wall has at least one vent hole formed to communicate with the internal space, and air is allowed to flow between the vent hole, the internal space, and the downward opening.

7 Claims, 22 Drawing Sheets

(58) Field of Classification Search
USPC .................. 401/1, 52, 195; 15/424–428, 431
See application file for complete search history.

(56) References Cited

U.S. PATENT DOCUMENTS 5,897,266 A * 4/1999 Robert .................... B43K 29/02
                                                                         401/52
2006/0029460 A1 2/2006 Russo

FOREIGN PATENT DOCUMENTS

JP          202049952 A     4/2020
JP          202069743 A     5/2020

* cited by examiner

FRICTION BODY UNIT AND THERMOCHROMIC WRITING INSTRUMENT

CROSS REFERENCE TO RELATED APPLICATIONS

This application is the United States national phase of International Patent Application No. PCT/JP2022/008753 filed Mar. 2, 2022, and claims priority to Japanese Patent Application Nos. 2021-036876 filed Mar. 9, 2021 and 2021-076905 filed Apr. 29, 2021, the disclosures of which are hereby incorporated by reference in their entireties

BACKGROUND OF THE INVENTION

Field of the Invention

The present invention relates to a friction unit configured to allow attachment to and detachment from a thermochromic writing instrument and to a thermochromic writing instrument including the friction unit.

Description of Related Art

Thermochromic writing instruments are provided with thermochromic ink and a friction piece. The friction piece is configured with an elastic material. Handwriting in the thermochromic ink written on a paper surface is abraded with the friction piece to generate frictional heat. The frictional heat causes the handwriting in the thermochromic ink to undergo a thermochromic change. The friction piece is worn by repeated use. Upon this, the present applicant proposes a friction unit configured to allow attachment to and detachment from such a thermochromic writing instrument. The friction unit facilitates replacement of a worn friction piece by a new friction piece.

For example, FIG. 6 in Japanese Patent Application Kokai Publication No. 2013-188922 discloses a friction unit in the past proposed by the present applicant. The friction unit includes a retention portion 4 and a friction piece 5. The retention portion 4 has a side wall 4C with three vertically-extending concave grooves 4CA. Each concave groove 4CA has a lower end continuing to a through hole 4CB. The through holes 4CB vertically penetrates a lower end portion 4D of the side wall 4C. Even if a child swallows the friction unit by mistake, the concave grooves 4CA and the through holes 4CB allow the air to flow.

PRIOR ART DOCUMENTS

Patent Document

Patent Document 1: Japanese Patent Application Kokai Publication No. 2013-188922

SUMMARY OF THE INVENTION

Problems to be Solved by the Invention

In recent years, to improve the quality of life of consumers, writing instruments tend to be designed in a more aesthetically pleasing manner. These days, new products of writing instruments designed in a wide variety are introduced to the market one after another. Meanwhile, all components constituting a writing instrument have a structure to achieve some function. The structure to achieve the function desirably does not limit the degree of freedom in the design of the writing instrument.

However, the friction unit in the past described above has a problem of limiting the degree of freedom in the design of the retention portion 4 by the plurality of through holes 4CB for airflow. That is, the plurality of through holes 4CB are configured to vertically penetrate the lower end portion 4D of the side wall 4C of the retention portion 4. To provide the plurality of through holes 4CB, the lower end portion 4D of the side wall 4C has to have a large outer diameter, which is a problem of limiting the degree of freedom in the design of the retention portion 4. Limiting the degree of freedom in the design of the retention portion 4 means to limit the degree of freedom in the design of the friction unit and the thermochromic writing instrument.

The present invention has been made in view of the above problems, and it is an object thereof to provide a friction unit capable of improving the degree of freedom in the design by a structure allowing sufficient airflow without causing the side wall of the retention portion to have a large outer diameter and to provide a thermochromic writing instrument including the same.

Means to Solve the Problems (1) To achieve the above object, a friction unit of the present invention includes a friction piece and a retention portion, the friction piece being configured to allow generation of frictional heat to cause handwriting in thermochromic ink to undergo a thermochromic change and the retention portion being configured to allow retention of the friction piece and attachment to and detachment from a barrel or cap of a thermochromic writing instrument, wherein the retention portion has a tubular side wall forming an internal space opening at least downward, the side wall has at least one vent hole formed to communicate with the internal space, and air is allowed to flow between the vent hole, the internal space, and the downward opening.

In the friction unit according to (1) above, the vent hole, the internal space, and the downward opening of the internal space form an air channel to communicate with inside and outside the retention portion. This air channel allows, even if a child swallows the friction unit by mistake, the airway for the child to breathe to be maintained. In particular, use of the internal space and the downward opening as the air channel allows sufficient airflow. Such an air channel is formed inside from the outer surface of the side wall of the retention portion and thus does not limit the degree of freedom in the design of the retention portion. Accordingly, the present invention improves the degree of freedom in the design of the friction unit and the thermochromic writing instrument.

(2) It is preferred that, in the friction unit according to (1) above, the tubular side wall of the retention portion includes a portion with a large outer diameter and a portion with a small outer diameter, and the vent hole has a first opening formed on an outer surface of the side wall and a second opening formed on an inner surface of the side wall and at least the first opening is located above a maximum outer diameter portion of the side wall.

In the friction unit according to (2) above, the first opening of the vent hole is located in a portion with a smaller outer diameter than that of the maximum outer diameter portion in the tubular side wall of the retention portion. With this configuration, if a child swallows the friction unit by mistake, the maximum outer diameter portion of the side wall of the retention portion contacts the wall of the trachea of the child and the portion with a smaller outer diameter than that of the maximum outer diameter portion does not contact the wall of the trachea of the child. As a result, the first opening of the vent hole is not closed by the wall of the trachea of the child and thus the airway for the child to breathe is maintained.

It should be noted that the term "outer diameter" herein means, in the case that the side wall of the retention portion is in a cylindrical shape, the diameter of the horizontal cross section of the side wall and means, in the case that the side wall of the retention portion is in a tubular shape other than the cylindrical shape, the diameter of a circle circumscribed on a horizontal cross section of the side wall. In addition, the term "maximum outer diameter portion" herein means, on the assumption that the side wall of the retention portion is in a tubular shape other than the cylindrical shape, a portion to have the maximum diameter of the circle circumscribed on the horizontal cross section of the side wall.

(3) It is preferred that, in the friction unit according to (2) above, at least part of the tubular side wall of the retention portion is provided with a tapered portion with an outer diameter decreasing upward from bottom and the first opening of the vent hole is formed in the tapered portion.

In the friction unit according to (3) above, the first opening of the vent hole is formed in the tapered portion with an outer diameter decreasing upward from the bottom. With this configuration, in the case that a child swallows the friction unit by mistake, the maximum outer diameter portion of the side wall of the retention portion contacts the wall of the trachea of the child and the portion with a smaller outer diameter than that of the maximum outer diameter portion does not contact the wall of the trachea of the child. As a result, the first opening of the vent hole is not closed by the wall of the trachea of the child to maintain the airway for the child to breathe.

(4) It is preferred that, in the friction unit according to (3) above, the tubular side wall of the retention portion includes a first tapered portion located above the maximum outer diameter portion and a second tapered portion located above the first tapered portion, the first tapered portion has an outer diameter decreasing upward from an upper end of the maximum outer diameter portion and the second tapered portion has an outer diameter decreasing upward from an upper end of the first tapered portion, the second tapered portion has an inclination angle greater than an inclination angle of the first tapered portion, and the first opening of the vent hole is formed in the second tapered portion.

The side wall of the retention portion of the friction unit according to (4) above includes the maximum outer diameter portion, the first tapered portion, and the second tapered portion. The second tapered portion has an outer diameter smaller than the outer diameter of the first tapered portion and an inclination angle greater than the inclination angle of the first tapered portion. The first opening of the vent hole is formed in the second tapered portion. With this configuration, in the case that a child swallows the friction unit by mistake, the second tapered portion does not contact the wall of the trachea of the child even if the first tapered portion contacts the wall of the trachea of the child. As a result, the first opening of the vent hole is not closed by the wall of the trachea of the child to maintain the airway for the child to breathe.

(5) It is preferred that, in the friction unit according to (3) above, in the tubular side wall of the retention portion, a portion above an upper end of the second opening of the vent hole has an outer diameter equal to or smaller than an outer diameter of the upper end of the second opening.

In the side wall of the retention portion of the friction unit according to (5) above, the portion above the upper end of the second opening of the vent hole has an outer diameter equal to or smaller than the outer diameter of the upper end of the second opening. With this configuration, in the case that a child swallows the friction unit by mistake, the portion above the upper end of the second opening of the vent hole does not contact the wall of the trachea of the child. As a result, a larger gap is formed between the portion above the upper end of the second opening of the vent hole and the wall of the trachea of the child to maintain the airway for the child to breathe. In addition, the portion above the upper end of the second opening of the vent hole has an outer diameter equal to or smaller than the outer diameter of the upper end of the second opening, and thus the outer shape of the retention portion may be injection molded with a single non-split mold, which does not require a slide core to form the vent hole. As a result, the cost for injection molding the retention portion is reduced.

(6) It is preferred that, in the friction unit according to any one of (2) through (5) above, an annular outward projection is provided on an outer surface on a lower side of the friction piece, an annular inward projection is provided on the inner surface of the tubular side wall of the retention portion and the side wall opens downward and upward, at least the second opening of the vent hole is located below the inward projection, in a state where the lower side of the friction piece is inserted into the internal space from the upward opening of the side wall, the outward projection is locked to the inward projection, and in a state where the outward projection is locked to the inward projection, a gap is formed between an outer surface of the outward projection and an inner surface of the side wall and the gap communicates with the vent hole.

In the friction unit according to (6) above, the annular outward projection is locked to the annular inward projection in a range of 360 degrees, and thus the lower side of the friction piece is firmly retained by the internal space of the retention portion. Moreover, in the state where the outward projection is locked to the inward projection, the gap is formed between the outer surface of the outward projection and the inner surface of the side wall. This gap communicates with the vent hole, thereby maintaining the air channel communicating with inside and outside the retention portion.

(7) It is preferred that, in the friction unit according to any one of (1) through (6) above, a plurality of concave portions are formed along a lower end of the tubular side wall of the retention portion.

In the friction unit according to (7) above, the plurality of concave portions are formed along the lower end of the tubular side wall of the retention portion. Firstly, the plurality of concave portions are used to maintain the position of the retention portion in an automated assembly procedure of the friction unit. That is, the plurality of concave portions are locked to a plurality of convex portions formed in a jig. This configuration limits movement and rotation of the retention portion and facilitates assembly of the friction piece to the retention portion.

Secondly, the plurality of concave portions inhibit firm joining of the retention portion to the barrel or cap of the thermochromic writing instrument. That is, the friction unit is mounted to the barrel or cap of the thermochromic writing instrument. In this situation, the lower end of the side wall of the retention portion has surface contact with the barrel or cap. If the pressure on the surface contact is high and the contact area is large, the lower end of the side wall of the retention portion is sometimes firmly joined to the barrel or cap and causes the friction unit not removable by hand. The plurality of concave portions reduce the area of the lower end of the side wall of the retention portion and facilitate removal of the friction unit by hand.

In addition, the plurality of concave portions accept foreign substances, such as dust and dirt, present between the lower end of the side wall of the retention portion and the barrel or cap not to cause the foreign substances to inhibit mounting of the friction unit. Moreover, a plurality of convex portions may be formed on the barrel or cap of the thermochromic writing instrument. When the friction unit is mounted to the barrel or cap of the thermochromic writing instrument, the plurality of concave portions are locked to the plurality of convex portions to limit rotation of the retention portion. In the case of configuring the friction unit to be screwed to the barrel or cap, the friction unit is not separated from the barrel or cap unintentionally.

(8) To achieve the above object, a thermochromic writing instrument of the present invention includes the friction unit according to any one of (1) through (7) above, wherein the barrel or cap of the thermochromic writing instrument is provided with a first connecting portion, and the friction unit is provided with a second connecting portion configured to allow attachment to and detachment from the first connecting portion.

In the thermochromic writing instrument according to (8) above, the friction unit may be freely designed in accordance with the design of the barrel or cap. For example, it is possible to integrate the appearance of the friction unit with the appearance of the barrel or cap by making the outer diameter of the retention portion of the friction unit coincide with the outer diameter of the barrel or cap. In particular, the friction unit according to any one of (1) through (7) above is not limited to have a large outer diameter of the retention portion to maintain the airflow. Accordingly, if the barrel or cap has a small outer diameter, the retention portion may have a small outer diameter. The friction unit allows the entire thermochromic writing instrument to be designed with a slim appearance.

(9) To achieve the above object, a thermochromic writing instrument of the present invention includes the friction unit according to (6) above, wherein the barrel or cap of the thermochromic writing instrument is provided with a first connecting portion, the friction unit is provided with a second connecting portion configured to allow attachment to and detachment from the first connecting portion, and when the second connecting portion is connected to the first connecting portion, the first connecting portion is located in the gap formed between the outer surface of the outward projection and the inner surface of the side wall.

The thermochromic writing instrument according to (9) above is capable of effectively using the gap formed in the internal space of the friction unit according to (6) above. That is, in the internal space of the retention portion of the friction unit according to (6) above, the gap constituting part of an air passage is formed. Here, the air channel of the friction unit exhibits the function if a child swallows the friction unit removed from the thermochromic writing instrument by mistake. Meanwhile, in the state where the friction unit is mounted to the thermochromic writing instrument, the air channel of the friction unit does not exhibit the function at all. Upon this, the thermochromic writing instrument according to (8) above is configured to have the first connecting portion of the thermochromic writing instrument stored in the gap constituting part of the air channel of the friction unit and is capable of effectively using the gap.

Effects of the Invention

The friction unit of the present invention is capable of improving the degree of freedom in the design with the structure allowing sufficient airflow without causing the side wall of the retention portion to have a large outer diameter. In addition, the thermochromic writing instrument of the present invention allows the entire thermochromic writing instrument including the friction unit to be designed with a uniform appearance. In particular, it is possible to design the entire thermochromic writing instrument with a slim appearance.

DESCRIPTION OF THE INVENTION

Figure 10:
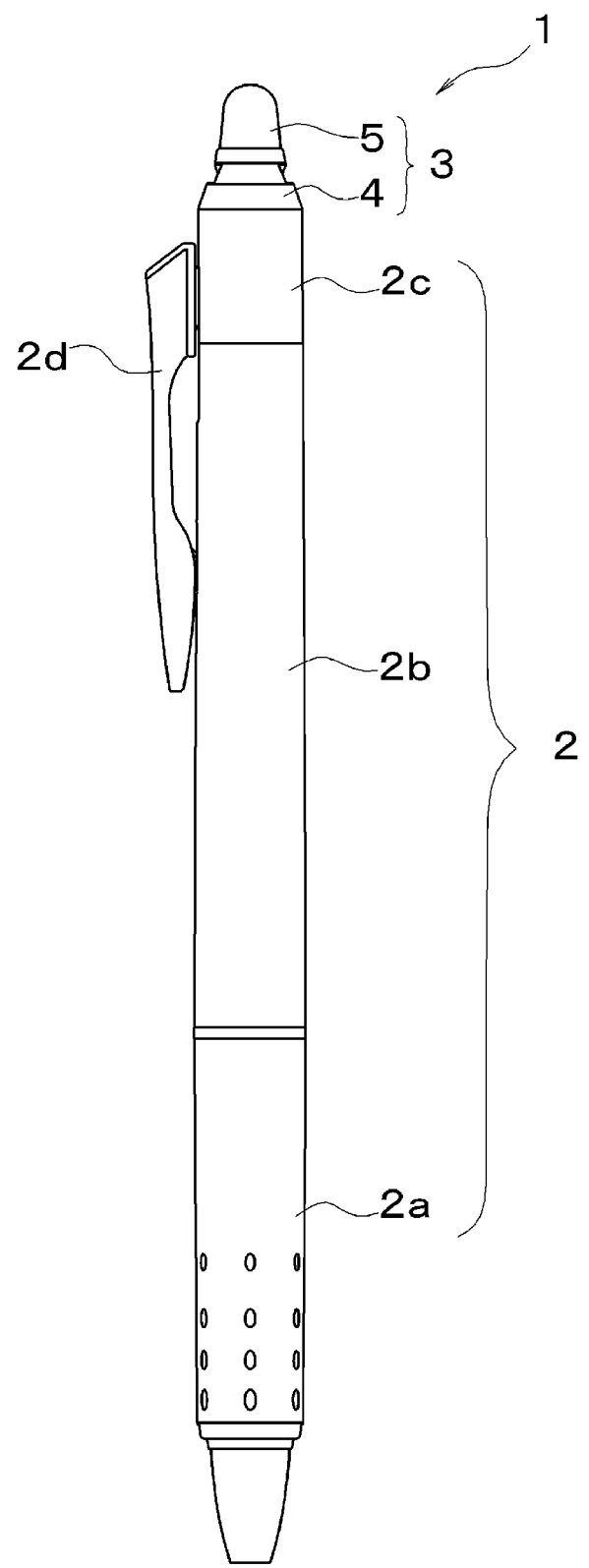
FIG. 10 is a front view illustrating a thermochromic writing instrument provided with a friction unit according to a second embodiment of the present invention.
Figure 13:
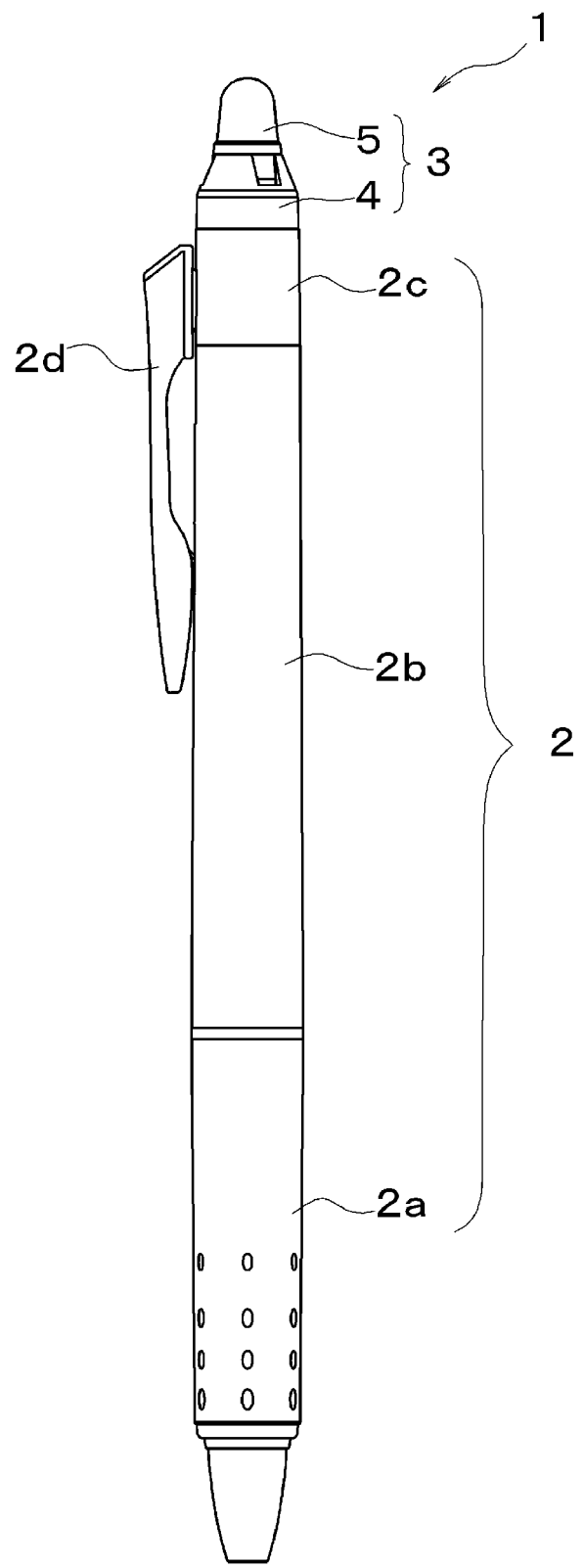
FIG. 13 is a front view illustrating a thermochromic writing instrument provided with a friction unit according to a third embodiment of the present invention.

Embodiments of a friction unit and a thermochromic writing instrument of the present invention is described below with reference to the drawings. It should be noted that, in the description below, the direction of the pen point of the thermochromic writing instrument 1 illustrated in FIGS. 1, 10, and 13 is defined as a "lower" direction and the direction of the friction piece 5 is defined as an "upper" direction.

First Embodiment

At first, the friction unit and the thermochromic writing instrument according to the first embodiment of the present invention are described with reference to FIGS. 1 through 9.

Figure 1:
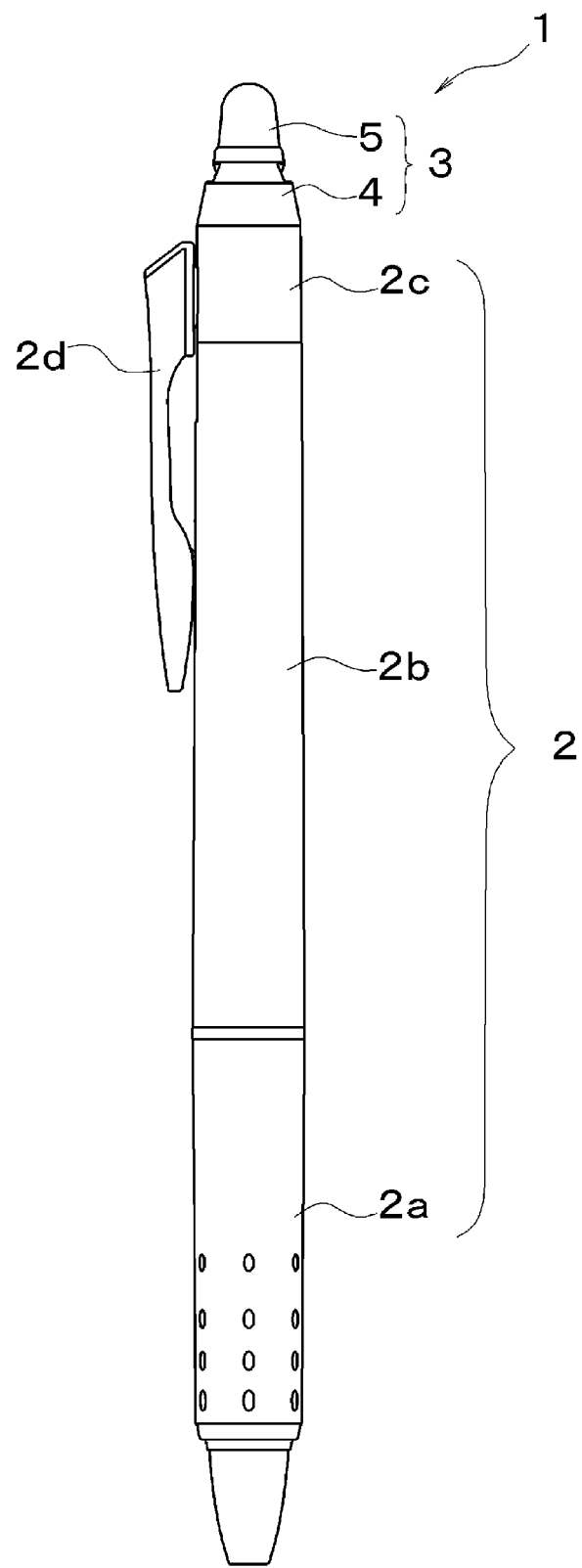
FIG. 1 is a front view illustrating a thermochromic writing instrument provided with a friction unit according to a first embodiment of the present invention.

As illustrated in FIG. 1, a thermochromic writing instrument 1 in the first embodiment is, for example, a retractable thermochromic writing instrument, and a barrel 2 stores a refill, not shown, inside vertically movably. The refill stores thermochromic ink inside. The refill is provided with a pen point, at a distal end, capable of discharging thermochromic ink. The thermochromic writing instrument 1 is provided with a pen point retractable mechanism. A clip 2d is slid downward to project the pen point from a lower end of the barrel 2 or to retract the pen point inside the barrel 2. FIG. 1 illustrates a state where the pen point is retracted inside the barrel 2. In the retracted state of the pen point, the clip 2d is slid downward to bring about a state where the pen point projects from the lower end of the barrel 2. In the projected state of the pen point, the clip 2d is slid downward to bring about the state where the pen point is retracted inside the barrel 2.

Meanwhile, a friction unit 3 is mounted to an upper end of the barrel 2. The friction unit 3 is configured with a retention portion 4 and a friction piece 5. Handwriting in thermochromic ink written on a paper surface is abraded with the friction piece 5 to generate frictional heat. The frictional heat allows the handwriting in thermochromic ink to undergo a thermochromic change.

It should be noted that the form of the thermochromic writing instrument of the present invention is not limited to the retractable instrument. For example, the thermochromic writing instrument of the present invention may be a capped thermochromic writing instrument configured to cover a pen point projecting from the lower end of the barrel with a cap. In this case, the friction unit 3 is mounted to an end portion of the cap or an upper end of the barrel. In this context, the end portion of the cap means the end portion opposite to the opening into which the lower end of the barrel is inserted. The barrel and cap of the capped thermochromic writing instrument are formed by a synthetic resin or metal.

Refill

The refill is configured by press-fitting the pen point to an opening at the lower end of an ink storage tube. Inside the ink storage tube is filled with thermochromic ink and a follower. The follower is filled at an upper end of the thermochromic ink inside the ink storage tube and moves down with consumption of the thermochromic ink. The follower is made from, for example, a high viscosity fluid. To an opening at the upper end of the ink storage tube, a breech is attached. The breech is provided with a through hole to allow airflow between inside and outside the ink storage tube.

Thermochromic Ink

The thermochromic ink has properties to change color by heating or cooling. A thermochromic change of the thermochromic ink includes an aspect of changing from being colored to being colorless, an aspect of changing from being colorless to being colored, and an aspect of changing from a first color to a second color.

The thermochromic ink is preferably reversible thermochromic ink capable of returning to the state before and after the thermochromic change. The reversible thermochromic ink includes various types, such as a type of removing color by heating, a type of retaining color memory, and a type of developing color by heating. The reversible thermochromic ink of the type of removing color by heating changes from being colored to being colorless by heating. The reversible thermochromic ink of the type of retaining color memory reversibly changes to a state of being colored or colorless at the boundary of a predetermined temperature and retains the state after the change in a specific temperature range. The thermochromic ink of the type of developing color by heating changes from being colorless to being colored by heating and returns to the state of being colorless from being colored by cooling. For example, in the case that the thermochromic writing instrument is a simplex thermochromic writing instrument provided with one refill, any one type of thermochromic ink is used singly. In the case that the thermochromic writing instrument is a multiplex thermochromic writing instrument provided with two or more refills, two or more types of thermochromic ink may be used together.

As a colorant to be contained in the reversible thermochromic ink, reversible thermochromic pigments configured to contain a reversible thermochromic compound in microcapsules are preferably used. The reversible thermochromic compound at least includes an electron-donating organic coloring compound, an electron accepting compound, and a reaction medium. The induction temperature for the coloration reaction of the electron-donating organic coloring compound with the electron accepting compound is determined by the reaction medium.

Pen Point

The pen point is configured with, for example, a ball-point pen tip made of metal. The ball-point pen tip has a lower end provided with a hole as an outlet for the thermochromic ink. On an inner surface of an edge portion of this hole, a ball is held rotatably. The ball-point pen tip is press-fit in the opening at the lower end of the ink storage tube of the refill. As another example, the ball-point pen tip is press-fit in the opening at the lower end of the ink storage tube of the refill via a pen point holder made of a synthetic resin. The pen point holder retains an outer surface of an upper portion of the ball-point pen tip. Inside the pen point, a coil spring is stored to press the ball on a lower end of the pen point. The coil spring has a lower end provided with a rod portion. This rod portion has a lower end contacting the ball. A biasing force of the coil spring causes the ball to be in close contact with the hole at the lower end of the ball-point pen tip. This configuration prevents ink leakage and ink evaporation from the pen point while the pen is not used for writing.

Barrel

As illustrated in FIG. 1, the barrel 2 of the thermochromic writing instrument 1 is configured with a lower barrel 2a, an intermediate barrel 2b, and an upper barrel 2c. Most of the lower barrel 2a is configured with a cylindrical portion. The cylindrical portion has a lower end side provided with a tapered portion with an outer diameter decreasing downward from the top. The cylindrical portion of the lower barrel 2a is used as a grip for the thermochromic writing instrument 1. The tapered portion of the lower barrel 2a is provided with an opening at a distal end. The pen point of the refill projects and retracts from the opening at the distal end of the tapered portion. The intermediate barrel 2b is configured only with a long cylindrical portion. The intermediate barrel 2b has a lower end portion connected to an upper end portion of the lower barrel 2a by screwing or press fitting. The upper barrel 2c is configured only with a short cylindrical portion. The upper barrel 2c has a lower end portion connected to an upper end portion of the intermediate barrel 2b by screwing or press fitting. The lower barrel 2a, the intermediate barrel 2b, and the upper barrel 2c are formed by, for example, metal or a synthetic resin, such as polycarbonate.

Figure 2:
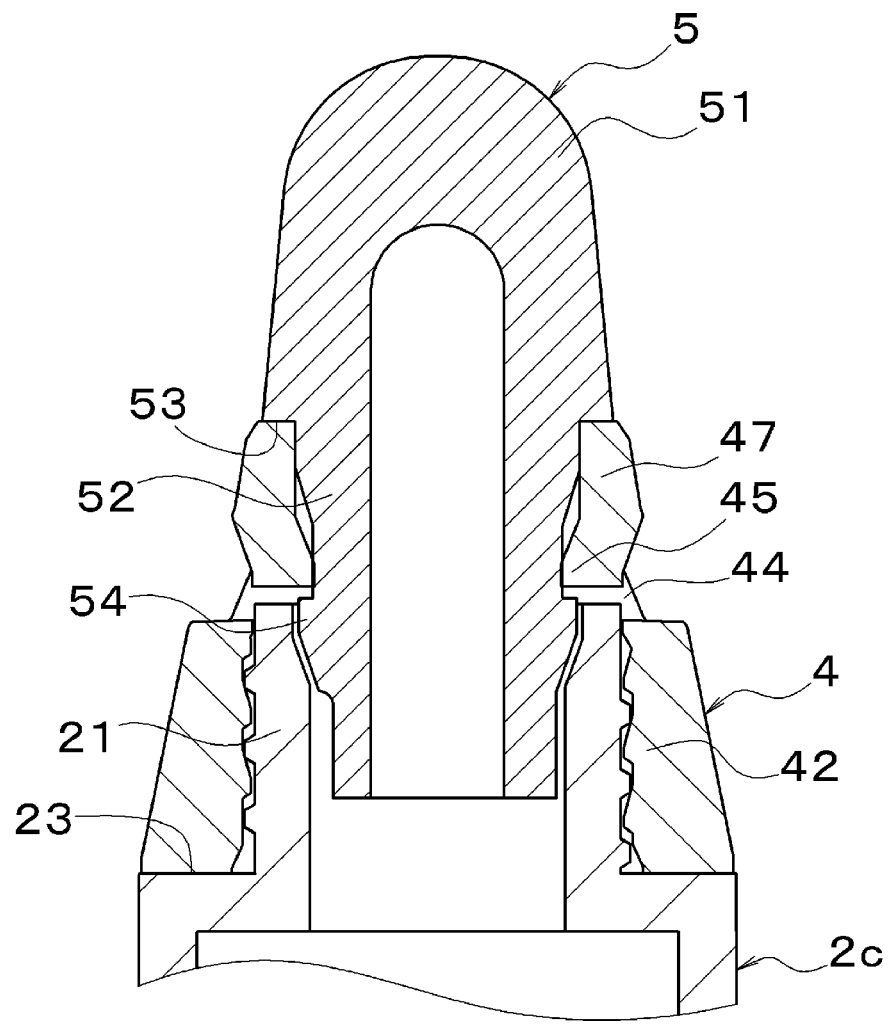
FIG. 2 is a cross-sectional view illustrating a portion including the friction unit and a barrel in FIG. 1.
Figure 3:
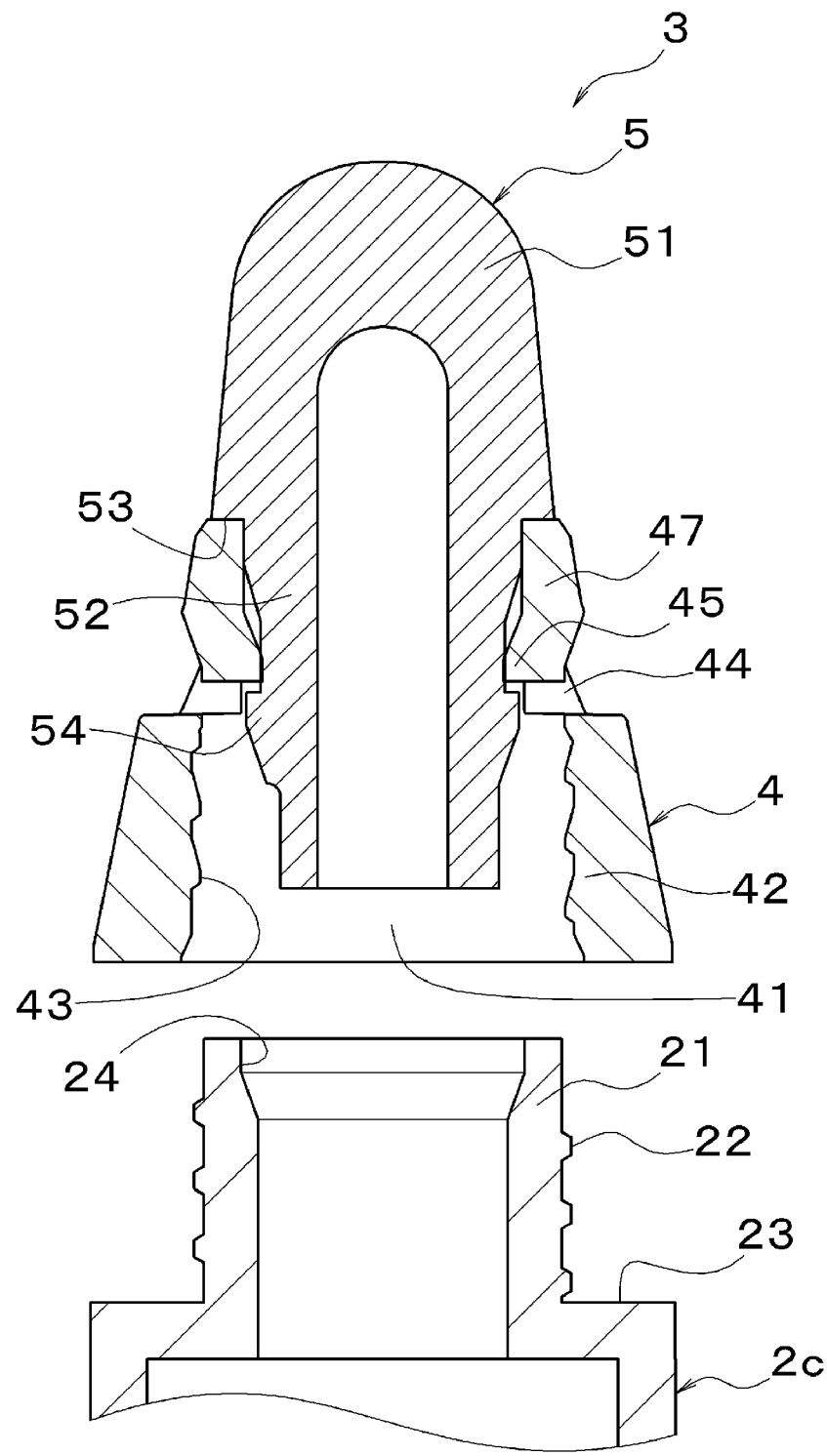
FIG. 3 is a cross-sectional view illustrating a state of exploding the friction unit and the barrel in FIG. 2.

As illustrated in FIGS. 2 and 3, the upper barrel 2c has an upper end portion provided with an approximately cylindrical first connecting portion 21 projecting upward. The first connecting portion 21 has an outer surface provided with an external thread 22. The first connecting portion 21 is screwed to a second connecting portion 42 provided in the retention portion 4 of the friction unit 3 described later. It should be noted that the connection between the first connecting portion 21 and the second connecting portion 42 is not limited to screwing and may be altered to a connection structure, such as fitting, press fitting, and engagement, for example.

In this situation, the first connecting portion 21 has an outer diameter smaller than the outer diameter at the upper end of the upper barrel 2c. With this configuration, at the upper end of the upper barrel 2c, an annular step portion 23 is formed. The annular step portion 23 has surface contact with a lower end of the retention portion 4 of the friction unit 3 described later.

Friction Unit

FIGS. 2 through 9 illustrate the friction unit 3 in the first embodiment. As illustrated in FIG. 3, the friction unit 3 is configured with the retention portion 4 and the friction piece 5. The friction unit 3 is mounted to the upper barrel 2c of the barrel 2 described above. The friction unit 3 has a height of, for example, 14.0 mm.

Retention Portion

As illustrated in FIGS. 3 through 8, the retention portion 4 has an upper portion 47 to which the friction piece 5 is attached. The retention portion 4 is formed by metal or a synthetic resin, such as polycarbonate, for example. The retention portion 4 has a height of, for example, 8.0 mm.

As illustrated in FIG. 3, the retention portion 4 has a tubular side wall forming an internal space 41 opening upward and downward. The retention portion 4 has a lower side provided with the second connecting portion 42. The second connecting portion 42 has an inner surface provided with an internal thread 43. The internal thread 43 is screwed to the external thread 22 of the first connecting portion 21 of the barrel 2. It should be noted that the connection between the first connecting portion 21 and the second connecting portion 42 is not limited to screwing and may be altered to a connection structure, such as fitting, press fitting, and engagement, for example.

The friction piece 5 is attached to the upper portion 47 of the retention portion 4. The upper portion 47 has an inner surface provided with an annular inward projection 45. Meanwhile, the friction piece 5 has an outer surface on a lower side provided with an annular outward projection 54. When the lower side of the friction piece 5 is inserted into the upper portion 47 of the retention portion 4, the inward projection 45 is locked to the outward projection 54. It should be noted that the connection between the retention portion 4 and the friction piece 5 is not limited to the locking between the inward projection 45 and the outward projection 54 and may be fitting, press fitting, engagement, screwing, adhesion, double injection molding, and the like.

The annular inward projection 45 has a tapered inclined surface with an inner diameter decreasing downward from the top and an annular lower surface. The inclined surface of the inward projection 45 guides the lower side of the friction piece 5 inserted into the upper portion 47 of the retention portion 4 to the lower part of the internal space 41. This configuration allows smooth locking of the outward projection 54 to the inward projection 45 and facilitates assembly of the friction unit 3.

Figure 4:
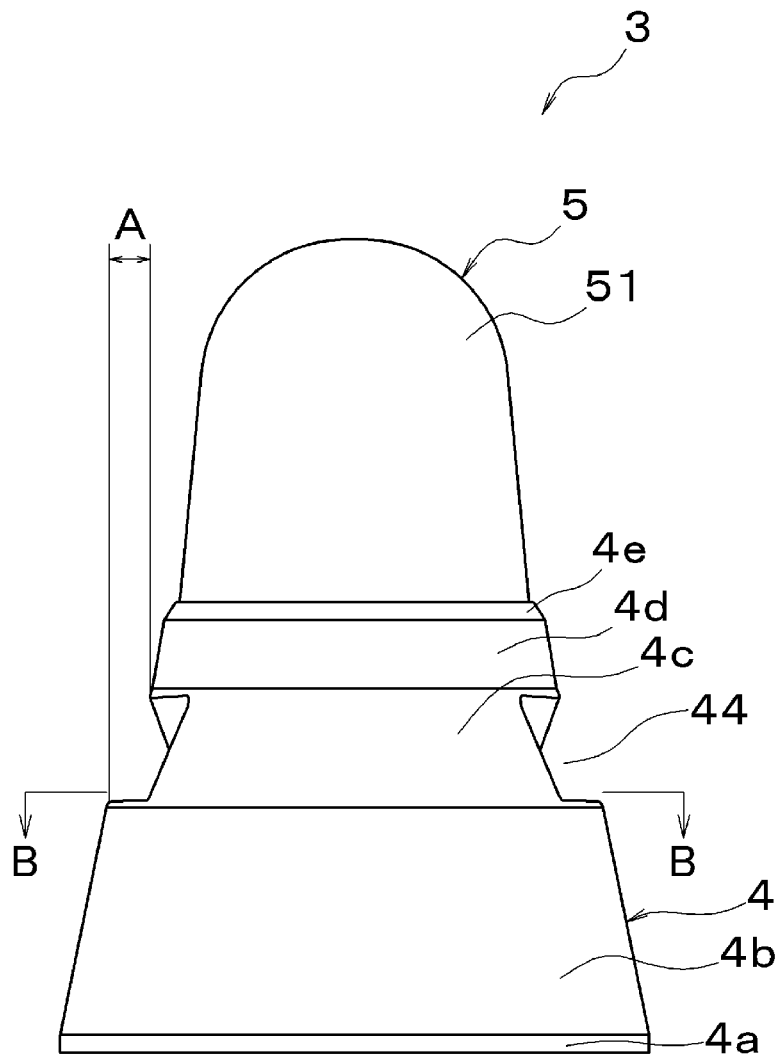
FIG. 4 is a front view illustrating the friction unit.
Figure 7:
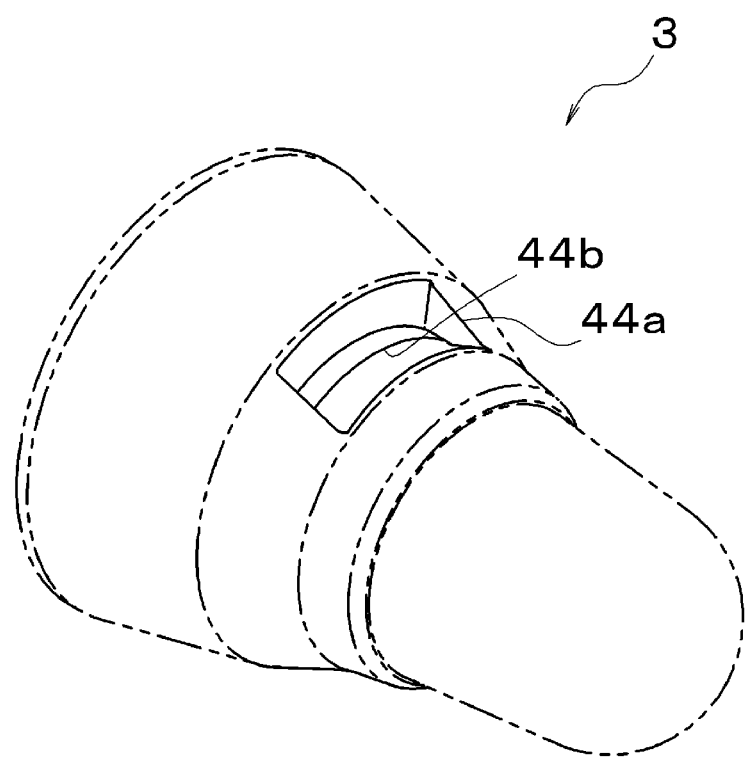
FIG. 7 is a perspective view illustrating a vent hole of the friction unit.
Figure 8:
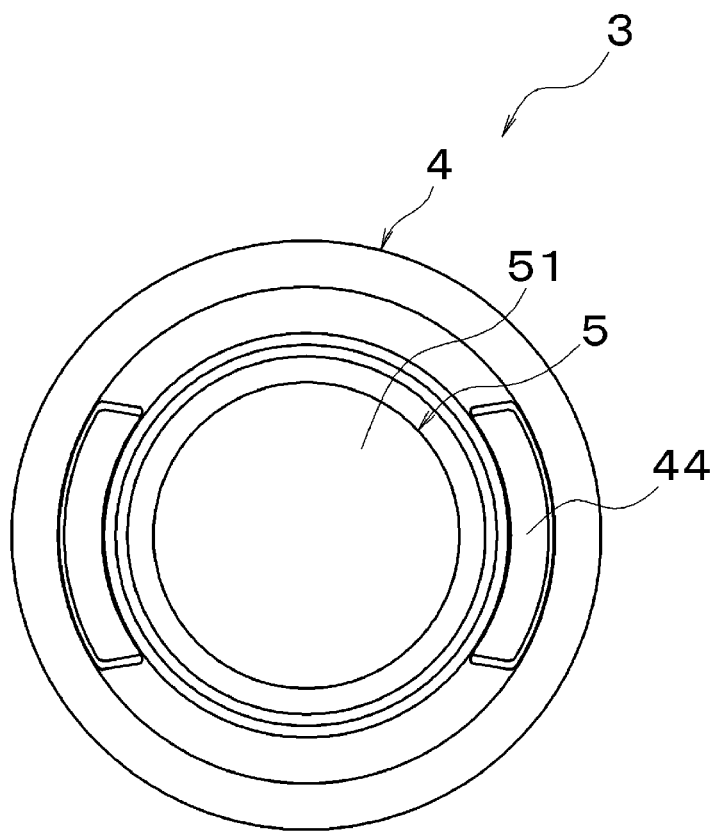
FIG. 8 is a plan view illustrating the friction unit.

As illustrated in FIGS. 3, 4, and 8, two vent holes 44 are formed in the retention portion 4. The two vent holes 44 are symmetrically arranged in the tubular side wall of the retention portion 4 to communicate with the internal space 41 of the retention portion 4. If a child swallows the friction unit 3 by mistake, the vent holes 44 function as an air channel for the child to breathe. In addition, a first opening 44a (refer to FIG. 7) of the vent holes 44 formed on an outer surface of the retention portion 4 functions as an antislip for fingers holding the friction unit 3. This configuration facilitates attachment and detachment of the friction unit 3 to and from the barrel 2.

Figure 5:
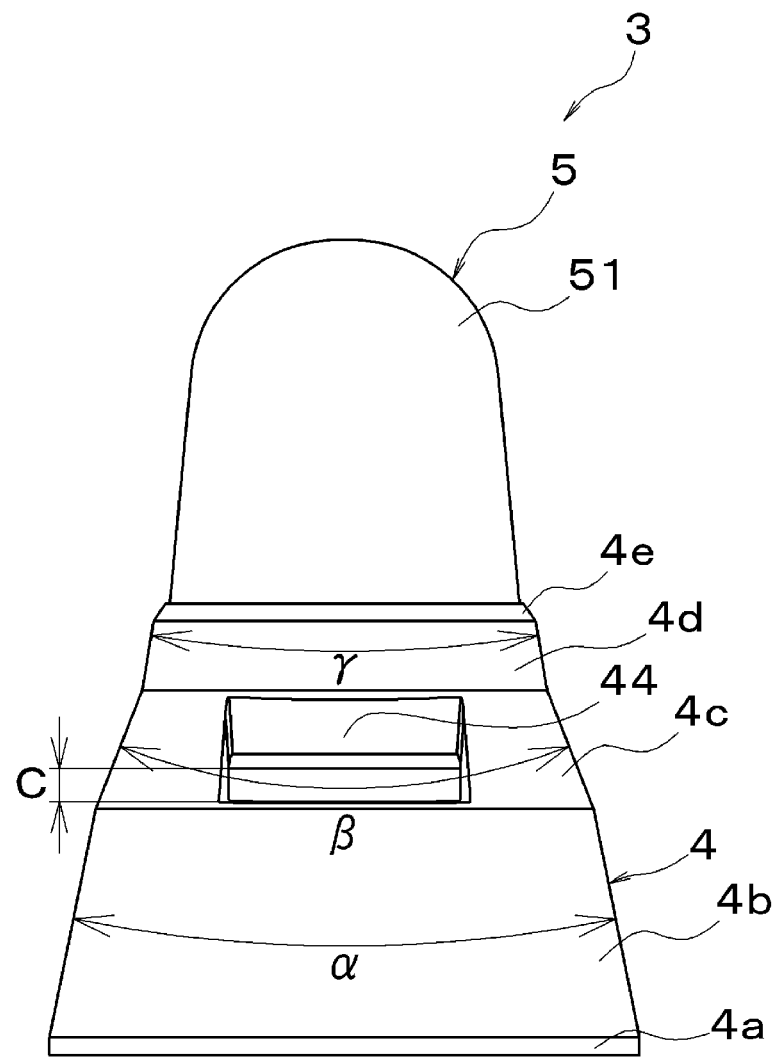
FIG. 5 is a right side view illustrating the friction unit.

Moreover, as illustrated in FIG. 5, the outer surface of the retention portion 4 is provided with three tapered portions 4b, 4c, and 4d with different inclination angles $\alpha$, $\beta$, and $\gamma$. All the three tapered portions 4b, 4c, and 4d have the inclination angles $\alpha$, $\beta$, and $\gamma$ of less than 45°, thereby facilitating holding with fingers at any position on the side wall of the retention portion 4. This configuration facilitates attachment and detachment of the friction unit 3 to and from the barrel 2. It should be noted that an antislip, such as a concave groove and a knurl, may be formed on the outer surface of the side wall of the retention portion 4 except the vent holes 44.

As illustrated in FIGS. 3 and 7, the vent holes 44 have the first opening 44a formed on the outer surface of the side wall of the retention portion 4 and a second opening 44b formed on an inner surface of the side wall of the retention portion 4. The entire vent holes 44 are located above the second connecting portion 42 and the second opening 44b of the vent holes 44 is located below the inward projection 45. With this configuration, the vent holes 44 penetrate the side wall of the retention portion 4 without interfering with the second connecting portion 42 and the inward projection 45. That is, the penetration of the vent holes 44 into the side wall of the retention portion 4 does not inhibit the functions of the second connecting portion 42 and the inward projection 45. As a result, the second connecting portion 42 is capable of being securely screwed to the first connecting portion 21 and the inward projection 45 is capable of being securely locked to the outward projection 54.

Figure 6:
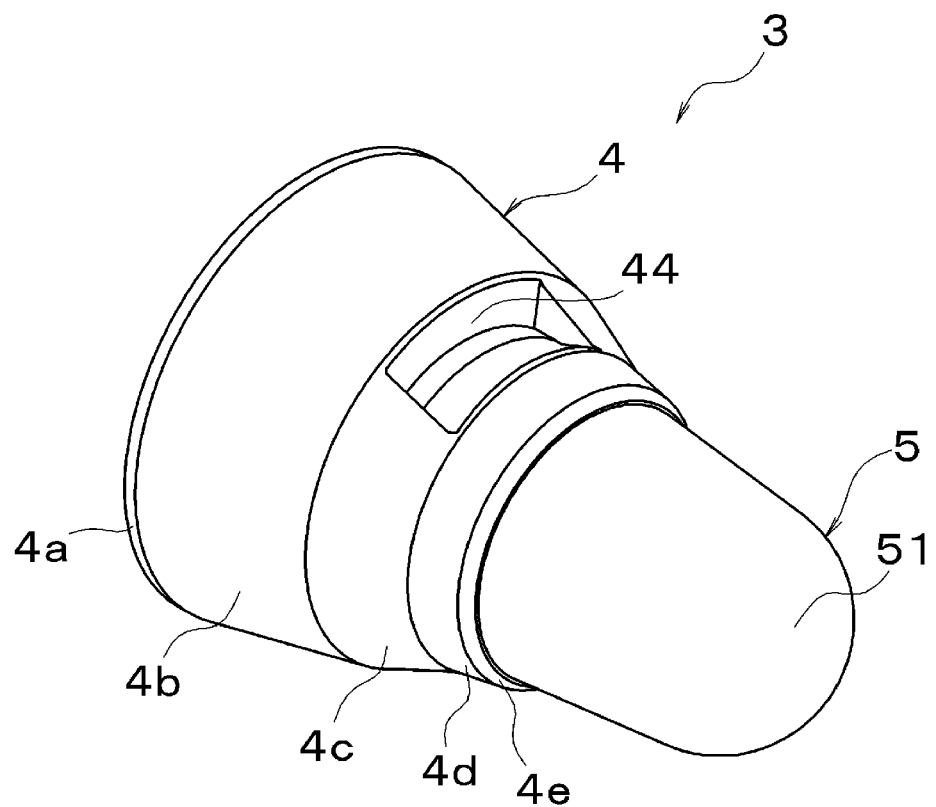
FIG. 6 is a perspective view illustrating the friction unit.

As illustrated in FIGS. 5 through 7, the first opening 44a of the vent holes 44 is formed on an inclined surface with an outer diameter decreasing upward from the bottom of a second tapered portion 4c. Thus, there is a diameter difference A illustrated in FIG. 4 between an upper end and a lower end of the first opening 44a of the vent holes 44. This diameter difference A allows inside the vent holes 44 to be enlarged from the second opening 44b to the first opening 44a. With this configuration, even if a child swallows the friction unit 3 by mistake, a sufficient amount of air is obtained from the vent holes 44. The diameter difference A illustrated in FIG. 4 is preferably 0.5 mm or more.

As illustrated in FIGS. 5 and 6, the outer surface of the retention portion 4 is configured with a maximum outer diameter portion 4a, the first tapered portion 4b, the second tapered portion 4c, the third tapered portion 4d, and a chamfered portion 4e. The first tapered portion 4b is located above the maximum outer diameter portion 4a. The second tapered portion 4c is located above the first tapered portion 4b. The third tapered portion 4d is located above the second tapered portion 4c. The chamfered portion 4e is located above the third tapered portion 4d. It should be noted that the outer surface of the maximum outer diameter portion 4a may be omitted to define a lower end of the first tapered portion 4b as the maximum outer diameter portion 4a.

All of the first tapered portion 4b, the second tapered portion 4c, and the third tapered portion 4d have an outer diameter decreasing upward from the bottom. The first tapered portion 4b, located lowest among the three tapered portions 4b, 4c, and 4d, preferably has an outer diameter decreasing in a range of 10% through 30%. For example, a lower end of the first tapered portion 4b (same as an upper end of the maximum outer diameter portion 4a) has an outer diameter of 10.0 mm and an upper end of the first tapered portion 4b has an outer diameter of 8.6 mm.

A lower end of the second tapered portion 4c has an outer diameter of 8.6 mm, and an upper end of the second tapered portion 4c has an outer diameter of 7.0 mm. The inclination angle $\beta$ of the second tapered portion 4c is greater than the inclination angle $\alpha$ of the first tapered portion 4b ($\alpha<\beta$). To facilitate holding of the retention portion 4, the inclination angle $\gamma$ of the third tapered portion 4d is preferably smaller than the inclination angle $\beta$ of the second tapered portion 4c ($\gamma<\beta$). The vent holes 44 are formed in the second tapered portion 4c. For example, it is assumed that $\alpha=23°$, $\beta=43°$, and $\gamma=20°$. It should be noted that the first tapered portion 4b, the second tapered portion 4c, and the third tapered portion 4d may be tapered with an extremely small inclination angle, such as a draft to facilitate stripping of a shaped article from the mold. In addition, the end portions as the boundary of the three tapered portions 4b, 4c, and 4d may be chamfered.

Figure 9:
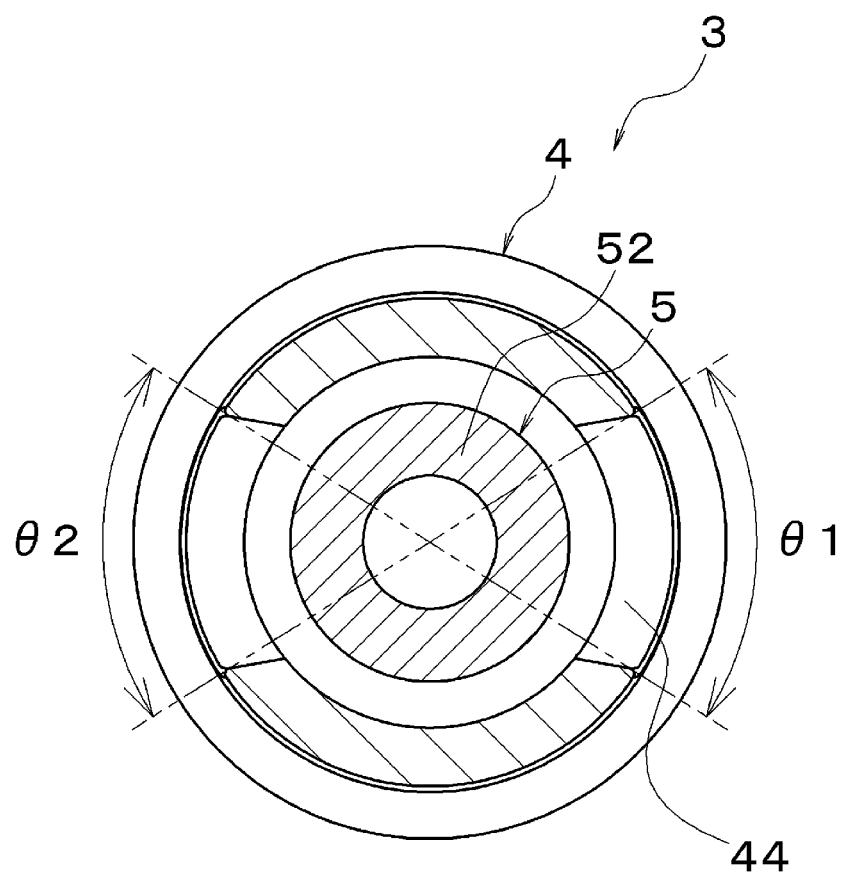
FIG. 9 is a cross-sectional view taken along the line B-B of FIG. 4.

FIG. 9 illustrates center angles θ1 and θ2 of the first opening 44a of the two vent holes 44. The center angles θ1 and θ2 of the first opening 44a are the angles made by two imaginary lines connecting two end portions located outermost of the first opening 44a with the center point of the retention portion 4. The sum total θ (θ=θ1+θ2) of the center angles θ1 and θ2 of the first opening 44a is preferably in a range of 90° through 180° and more preferably in a range of 90° through 150°. The reason is because the sum total θ of less than 90° does not allow a sufficient quantity of airflow to be obtained and the sum total θ of more than 180° (more preferably 150°) does not allow sufficient strength of the retention portion 4 to be obtained.

FIG. 5 illustrates a height C of the second opening 44b of the vent holes 44. The height C of the second opening 44b is preferably 0.5 mm or more. This is because the height C of the second opening 44b of 0.5 mm or more allows a sufficient quantity of airflow to be obtained if a child swallows the friction unit 3 by mistake.

Friction Piece

As illustrated in FIG. 3, the friction piece 5 is configured by integrally forming a friction portion 51 in a bullet shape and an attachment portion 52 in an approximately cylindrical shape as a single piece. At the center of the friction piece 5, an axially extending internal hole is formed. Inside the friction portion 51 is thus a cavity except an upper end portion of the friction portion 51. The friction portion 51 has an upper end portion with a curved convex outer surface. The friction portion 51 has a circular horizontal cross section. The friction portion 51 has an outer diameter greater than an outer diameter of the attachment portion 52. Thus, at the boundary between the friction portion 51 and the attachment portion 52, an annular step portion 53 is formed.

The attachment portion 52 of the friction piece 5 has an outer surface integrally formed with the annular outward projection 54 described above as a single piece. The outward projection 54 has an annular upper surface and an inclined surface with an outer diameter decreasing downward from the top. When the attachment portion 52 of the friction piece 5 is inserted into the upper portion 47 of the retention portion 4, the inclined surface of the outward projection 54 is guided by the inclined surface of the inward projection 45 described above. With this configuration, the outward projection 54 smoothly passes the inward projection 45 and the outward projection 54 is locked to the inward projection 45. In this situation, the step portion 53 of the friction piece 5 abuts on an upper end of the retention portion 4.

The annular upper surface of the outward projection 54 abuts on the annular lower surface of the inward projection 45, thereby preventing the friction piece 5 from readily slipping out of the upper portion 47 of the retention portion 4. It should be noted that the connection between the retention portion 4 and the friction piece 5 is not limited to the locking between the inward projection 45 and the outward projection 54 and may be fitting, press fitting, engagement, screwing, adhesion, double injection molding, and the like.

It should be noted that the friction portion 51 preferably has an outer diameter decreasing upward from the bottom. The friction portion 51 preferably has a maximum outer diameter smaller than an outer diameter of the upper end of the retention portion 4. Such a configuration allows the friction piece 5 to be prevented from falling out of the retention portion 4 and, if a child swallows the friction unit 3 by mistake, allows an air channel to be maintained.

The friction piece 5 is configured with an elastic material. Examples of the elastic material to be employed include synthetic resins with rubber elasticity, such as a silicone resin, an SBS resin (styrene-butadiene-styrene copolymer), and an SEBS resin (styrene-ethylene-butylene-styrene copolymer). Handwriting in thermochromic ink written on a paper surface is abraded with the friction portion 51 to generate frictional heat. The frictional heat causes the handwriting in thermochromic ink to undergo a thermochromic change.

Mounting State of Friction Unit

As illustrated in FIGS. 2 and 3, the friction unit 3 is attachable to and detachable from the upper barrel 2c of the thermochromic writing instrument 1. As illustrated in FIG. 2, when the friction unit 3 is mounted to the upper barrel 2c, the lower end of the retention portion 4 abuts on the step portion 23 of the upper barrel 2c.

As illustrated in FIG. 3, an upper part of an inner surface of the first connecting portion 21 is provided with an enlarged diameter portion 24 matching the outer shape of the outward projection 54. The enlarged diameter portion 24 has an inclined surface with an inner diameter increasing upward from the bottom. As illustrated in FIG. 2, when the friction unit 3 is mounted to the upper barrel 2c, the enlarged diameter portion 24 does not contact an outer surface of the outward projection 54.

It should be noted that the enlarged diameter portion 24 may be configured to contact the outer surface of the outward projection 54. The contact of the outer surface of the outward projection 54 to the enlarged diameter portion 24 inhibits wobbling of the friction piece 5.

Here, in the first embodiment, when the friction unit 3 is mounted to the upper barrel 2c, an upper end of the first connecting portion 21 is configured to be located above a lower end of the second opening 44b of the vent holes 44. This configuration allows visual confirmation of whether the friction unit 3 is fully mounted to the upper barrel 2c via the vent holes 44. It should be noted that the retention portion 4 preferably has a different color from that of the first connecting portion 21. This configuration facilitates the determination of whether the friction unit 3 is fully mounted to the upper barrel 2c.

Moreover, the upper end of the first connecting portion 21 is located above the lower end of the second opening 44b of the vent holes 44, thereby preventing dust and dirt from entering inside the friction unit 3 from the vent holes 44 and allowing the friction unit 3 to be kept clean.

Action and Effect

In the friction unit 3 of the first embodiment described above, the vent holes 44, the internal space 41, and the downward opening of the internal space 41 form an air channel to communicate with inside and outside the retention portion 4. This air channel allows, even if a child swallows the friction unit 3 by mistake, the airway for the child to breathe to be maintained. In particular, use of the internal space 41 and the downward opening as the air channel allows sufficient airflow. Since such an air channel is formed inside from the outer surface of the side wall of the retention portion 4, the degree of freedom in the design of the retention portion 4 is not limited. Accordingly, the configuration in the first embodiment improves the degree of freedom in the design of the friction unit 3 and the thermochromic writing instrument 1.

In the friction unit 3 in the first embodiment, the first opening 44a of the vent holes 44 is located in the portion with a smaller outer diameter than that of the maximum outer diameter portion 4a in the tubular side wall of the retention portion 4. With this configuration, if a child swallows the friction unit 3 by mistake, the maximum outer diameter portion 4a of the side wall of the retention portion 4 contacts the wall of the trachea of the child and the portion with a smaller outer diameter than that of the maximum outer diameter portion 4a does not contact the wall of the trachea of the child. As a result, the first opening 44a of the vent holes 44 is not closed by the wall of the trachea of the child and the airway for the child to breathe is maintained.

In the friction unit 3 in the first embodiment, the first opening 44a of the vent holes 44 is formed in the second tapered portion 4c with an outer diameter decreasing upward from the bottom. With this configuration, if a child swallows the friction unit 3 by mistake, the maximum outer diameter portion 4a of the side wall of the retention portion 4 contacts the wall of the trachea of the child and the portion with a smaller outer diameter than that of the maximum outer diameter portion 4a does not contact the wall of the trachea of the child. As a result, the first opening 44a of the vent holes 44 is not closed by the wall of the trachea of the child and the airway for the child to breathe is maintained.

The side wall of the retention portion 4 of the friction unit 3 in the first embodiment includes the maximum outer diameter portion 4a, the first tapered portion 4b, and the second tapered portion 4c. The second tapered portion 4c has an outer diameter smaller than the outer diameter of the first tapered portion 4b and the inclination angle β greater than the inclination angle α of the first tapered portion 4b. The first opening 44a of the vent holes 44 is formed in the second tapered portion 4c. With this configuration, if a child swallows the friction unit 3 by mistake, the second tapered portion 4c does not contact the wall of the trachea of the child even if the friction unit 3 is tilted and the first tapered portion 4b contacts the wall of the trachea of the child. As a result, the first opening 44a of the vent holes 44 is not closed by the wall of the trachea of the child and the airway for the child to breathe is maintained.

In the thermochromic writing instrument 1 in the first embodiment, the annular outward projection 54 is locked to the annular inward projection 45 in the range of 360 degrees, thereby firmly retaining the attachment portion 52 of the friction piece 5 in the internal space 41 of the retention portion 4. Moreover, in the state where the outward projection 54 is locked to the inward projection 45, a gap is formed between the outer surface of the outward projection 54 and inner surface of the retention portion 4. This gap communicates with the vent holes 44, thereby maintaining the air channel to communicate with inside and outside the retention portion 4.

In addition, the air channel of the friction unit 3 exhibits the function if a child swallows a friction unit 3 removed from the thermochromic writing instrument 1 by mistake. Meanwhile, in the state where the friction unit 3 is mounted to the thermochromic writing instrument 1, the air channel of the friction unit 3 does not exhibit the function at all. Upon this, the first embodiment is configured to store the first connecting portion 21 of the thermochromic writing instrument 1 in the gap constituting part of the air channel of the friction unit 3 and is capable of effectively using this gap.

Second Embodiment

Then, a friction unit and a thermochromic writing instrument according to the second embodiment of the present invention is described with reference to FIGS. 10 through 12.

Figure 11:
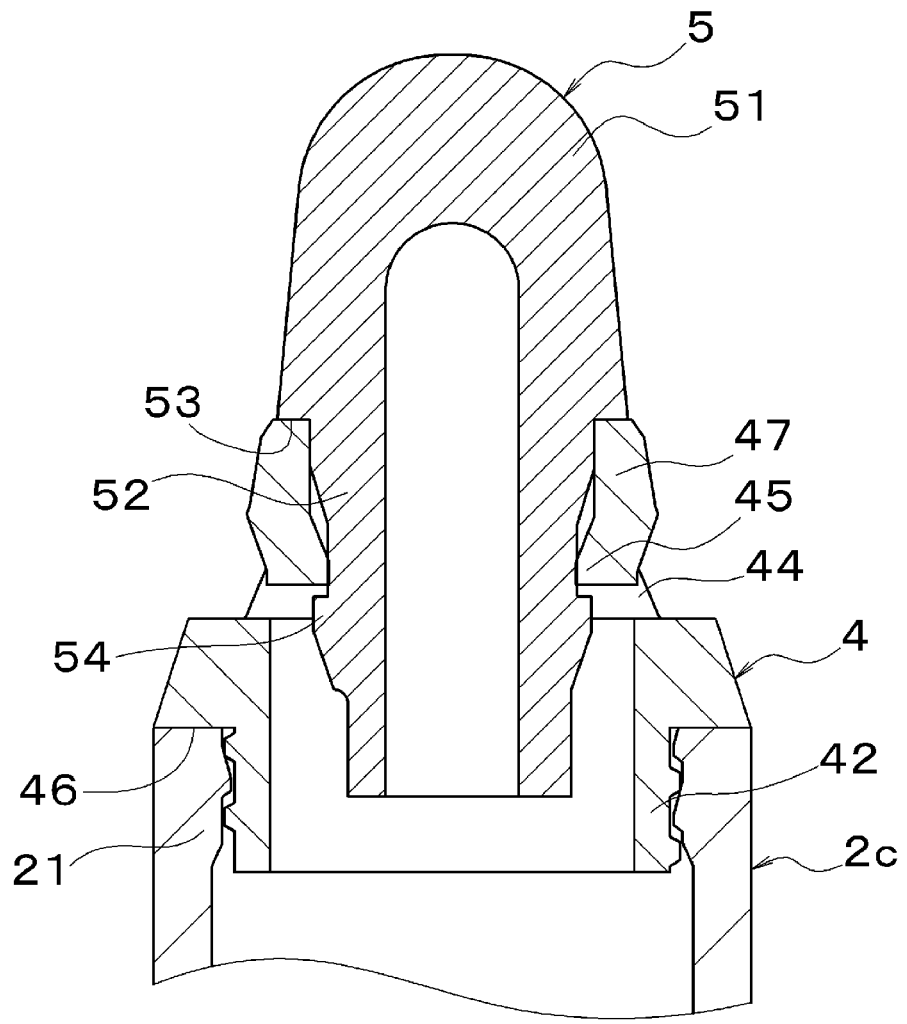
FIG. 11 is a cross-sectional view illustrating a portion including the friction unit and a barrel in FIG. 10.
Figure 12:
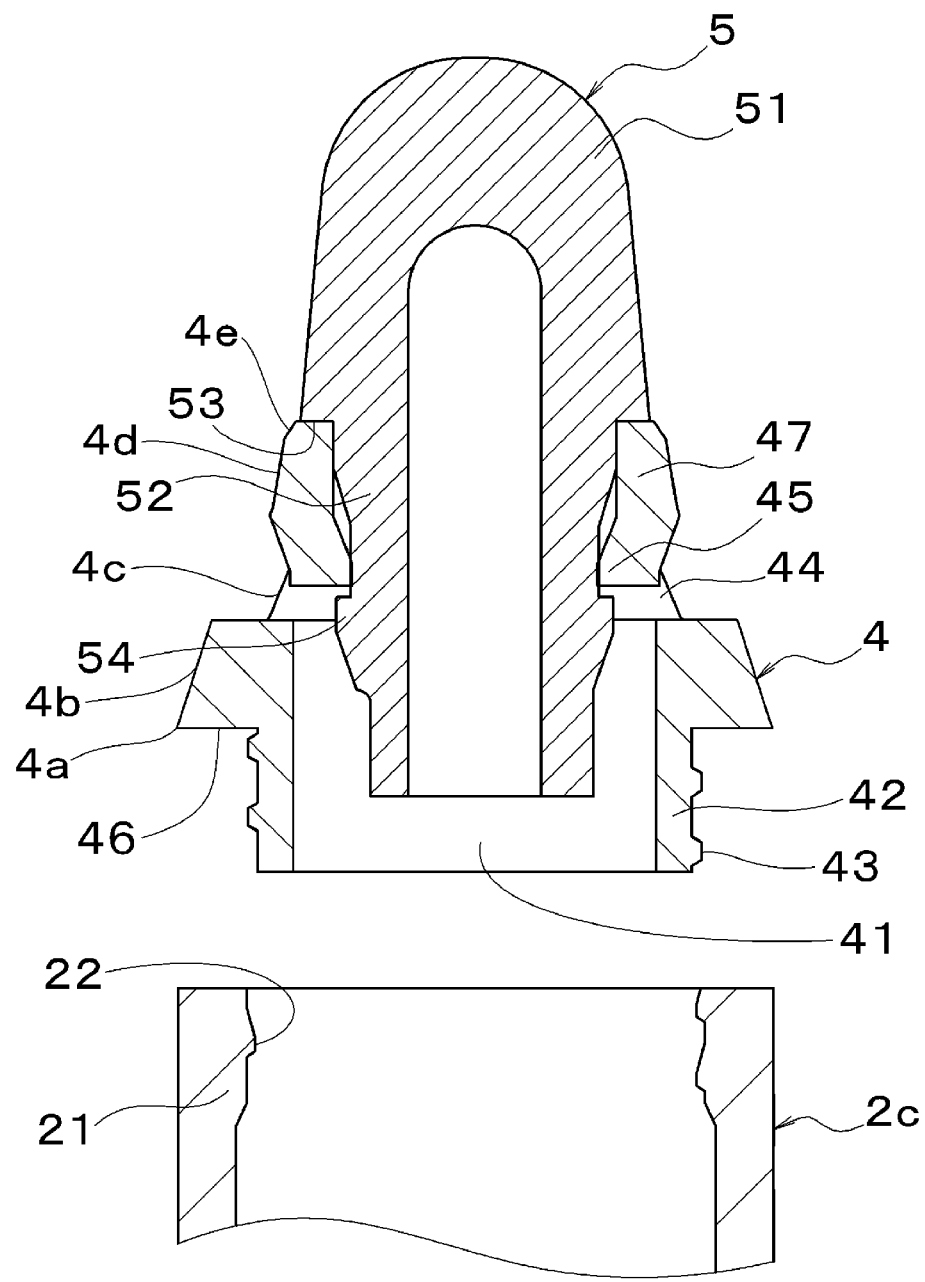
FIG. 12 is a cross-sectional view illustrating a state of exploding the friction unit and the barrel in FIG. 11.

As illustrated in FIGS. 11 and 12, the friction unit 3 and the thermochromic writing instrument 1 in the second embodiment are different from those in the first embodiment in that the first connecting portion 21 of the upper barrel 2c is provided with the internal thread 22 and the second connecting portion 42 of the retention portion 4 is provided with the external thread 43. In the friction unit 3 and the thermochromic writing instrument 1 in the second embodiment described below, a detailed description on the configuration identical to that in the first embodiment is omitted.

Barrel

As illustrated in FIG. 10, the barrel 2 of the thermochromic writing instrument 1 is configured with the lower barrel 2a, the intermediate barrel 2b, and the upper barrel 2c. Most of the lower barrel 2a is configured with a cylindrical portion. The cylindrical portion has a lower end side provided with a tapered portion with an outer diameter decreasing downward from the top. The cylindrical portion of the lower barrel 2a is used as a grip for the thermochromic writing instrument 1. The lower barrel 2a is provided with an opening at the distal end of the tapered portion. A pen point of a refill projects and retracts from an opening at the distal end of the tapered portion. The intermediate barrel 2b is configured only with a long cylindrical portion. A lower end portion of the intermediate barrel 2b is connected to an upper end portion of the lower barrel 2a by screwing or press fitting. The upper barrel 2c is configured only with a short cylindrical portion. A lower end portion of the upper barrel 2c is connected to an upper end portion of the intermediate barrel 2b by screwing or press fitting. The lower barrel 2a, the intermediate barrel 2b, and the upper barrel 2c are formed by metal or a synthetic resin, such as polycarbonate, for example.

As illustrated in FIGS. 11 and 12, the tubular upper barrel 2c has an upper end portion provided with the first connecting portion 21. The first connecting portion 21 has an inner surface provided with the internal thread 22. The first connecting portion 21 is screwed to the second connecting portion 42 provided in the retention portion 4 of the friction unit 3. It should be noted that the connection between the first connecting portion 21 and the second connecting portion 42 is not limited to screwing and may be altered to a connection structure, such as fitting, press fitting, and engagement, for example.

Friction Unit

As illustrated in FIGS. 11 and 12, the friction unit 3 is configured with the retention portion 4 and the friction piece 5. The friction unit 3 is mounted to the upper barrel 2c of the barrel 2 described above. The friction unit 3 has a height of, for example, 14.0 mm.

Retention Portion

The retention portion 4 has the upper portion 47 to which the friction piece 5 is attached. The retention portion 4 is formed by metal or a synthetic resin, such as polycarbonate, for example. The retention portion 4 has a height of, for example, 8.0 mm.

As illustrated in FIG. 12, the retention portion 4 has a tubular side wall forming the internal space 41 opening upward and downward. The retention portion 4 has a lower side provided with the second connecting portion 42 projecting downward in an approximately cylindrical shape. The second connecting portion 42 has an outer surface provided with an external thread 43. The external thread 43 is screwed to the internal thread 22 of the first connecting portion 21 of the barrel 2. It should be noted that the connection between the first connecting portion 21 and the second connecting portion 42 is not limited to screwing and may be altered to a connection structure, such as fitting, press fitting, and engagement.

The second connecting portion 42 has an outer diameter smaller than the maximum outer diameter of the retention portion 4. With this configuration, at the boundary between the maximum outer diameter portion 4a and the second connecting portion 42 of the retention portion 4, an annular step portion 46 is formed. The annular step portion 46 has surface contact with the upper end of the upper barrel 2c of the barrel 2 described later.

In the retention portion 4, two vent holes 44 are formed. The two vent holes 44 are symmetrically arranged in the tubular side wall of the retention portion 4 to communicate with the internal space 41 of the retention portion 4. If a child swallows the friction unit 3 by mistake, the vent holes 44 function as an air channel for the child to breathe. In addition, the first opening 44a (refer to FIG. 7) of the vent holes 44 formed on the outer surface of the retention portion 4 functions as an antislip for fingers holding the friction unit 3. This configuration facilitates attachment and detachment of the friction unit 3 to and from the barrel 2. It should be noted that an antislip, such as a concave groove and a knurl, may be formed on the outer surface of the side wall of the retention portion 4 except the vent holes 44.

The entire vent holes 44 are located above the second connecting portion 42 and the second opening 44b of the vent holes 44 (refer to FIG. 7) is located below the inward projection 45. With this configuration, the vent holes 44 penetrate the side wall of the retention portion 4 without interfering with the second connecting portion 42 and the inward projection 45. That is, the penetration of the vent holes 44 into the side wall of the retention portion 4 does not inhibit the functions of the second connecting portion 42 and the inward projection 45. As a result, the second connecting portion 42 is capable of being securely screwed to the first connecting portion 21 and the inward projection 45 is capable of being securely locked to the outward projection 54.

As illustrated in FIG. 12, the outer surface of the retention portion 4 is configured with the maximum outer diameter portion 4a, the first tapered portion 4b, the second tapered portion 4c, the third tapered portion 4d, and a chamfered portion 4e. The first tapered portion 4b is located above the maximum outer diameter portion 4a. The second tapered portion 4c is located above the first tapered portion 4b. The third tapered portion 4d is located above the second tapered portion 4c. The chamfered portion 4e is located above the third tapered portion 4d. It should be noted that, in the second embodiment, the lower end of the first tapered portion 4b is the maximum outer diameter portion 4a and the maximum outer diameter portion 4a does not have an outer surface.

All of the first tapered portion 4b, the second tapered portion 4c, and the third tapered portion 4d have an outer diameter decreasing upward from the bottom. The first tapered portion 4b, located lowest among the three tapered portions 4b, 4c, and 4d, preferably has an outer diameter decreasing in a range of 10% through 30%. For example, the lower end of the first tapered portion 4b (same as the maximum outer diameter portion 4a) has an outer diameter of 10.0 mm and the upper end of the first tapered portion 4b has an outer diameter of 8.8 mm.

The lower end of the second tapered portion 4c has an outer diameter of 8.8 mm, and the upper end of the second tapered portion 4c has an outer diameter of 6.8 mm. The inclination angle $\beta$ of the second tapered portion 4c is greater than the inclination angle $\alpha$ of the first tapered portion 4b ($\alpha<\beta$). To facilitate holding of the retention portion 4, the inclination angle $\gamma$ of the third tapered portion 4d is preferably smaller than the inclination angle $\beta$ of the second tapered portion 4c ($\gamma<\beta$). The vent holes 44 are formed in the second tapered portion 4c. For example, it is assumed that $\alpha=40°$, $\beta=58°$, and $\gamma=20°$.

Mounting State of Friction Unit

As illustrated in FIGS. 11 and 12, the friction unit 3 is attachable to and detachable from the upper barrel 2c of the thermochromic writing instrument 1. As illustrated in FIG. 11, when the friction unit 3 is mounted to the upper barrel 2c, the step portion 46 of the retention portion 4 abuts on the upper end of the upper barrel 2c.

As illustrated in FIG. 12, the vent holes 44 in the second embodiment are formed on the side wall of the retention portion 4 in the area not provided with the second connecting portion 42. With this configuration, the air channel formed by the vent holes 44, the internal space 41, and the downward opening of the internal space 41 is capable of smoothly flowing the air without affected at all by the convexity and concavity of the external thread 43.

Action and Effect

In the friction unit 3 of the second embodiment described above, the vent holes 44, the internal space 41, and the downward opening of the internal space 41 form an air channel to communicate with inside and outside the retention portion 4. This air channel allows, even if a child swallows the friction unit 3 by mistake, the airway for the child to breathe to be maintained. In particular, use of the internal space 41 and the downward opening as the air channel allows sufficient airflow. Since such an air channel is formed inside from the outer surface of the side wall of the retention portion 4, the degree of freedom in the design of the retention portion 4 is not limited. Accordingly, the configuration in the second embodiment improves the degree of freedom in the design of the friction unit 3 and the thermochromic writing instrument 1.

In the friction unit 3 in the second embodiment, the first opening 44a of the vent holes 44 is located in the portion with a smaller outer diameter than that of the maximum outer diameter portion 4a in the tubular side wall of the retention portion 4. With this configuration, if a child swallows the friction unit 3 by mistake, the maximum outer diameter portion 4a of the side wall of the retention portion 4 contacts the wall of the trachea of the child and the portion with a smaller outer diameter than that of the maximum outer diameter portion 4a does not contact the wall of the trachea of the child. As a result, the first opening 44a of the vent holes 44 is not closed by the wall of the trachea of the child and the airway for the child to breathe is maintained.

In the friction unit 3 in the second embodiment, the first opening 44a of the vent holes 44 is formed in the second tapered portion 4c with an outer diameter decreasing upward from the bottom. With this configuration, if a child swallows the friction unit 3 by mistake, the maximum outer diameter portion 4a of the side wall of the retention portion 4 contacts the wall of the trachea of the child and the portion with a smaller outer diameter than that of the maximum outer diameter portion 4a does not contact the wall of the trachea of the child. As a result, the first opening 44a of the vent holes 44 is not closed by the wall of the trachea of the child and the airway for the child to breathe is maintained.

The side wall of the retention portion 4 of the friction unit 3 in the second embodiment includes the maximum outer diameter portion 4a, the first tapered portion 4b, and the second tapered portion 4c. The second tapered portion 4c has an outer diameter smaller than the outer diameter of the first tapered portion 4b and the inclination angle β greater than the inclination angle α of the first tapered portion 4b. The first opening 44a of the vent holes 44 is formed in the second tapered portion 4c. With this configuration, if a child swallows the friction unit 3 by mistake, the second tapered portion 4c does not contact the wall of the trachea of the child even if the friction unit 3 is tilted and the first tapered portion 4b contacts the wall of the trachea of the child. As a result, the first opening 44a of the vent holes 44 is not closed by the wall of the trachea of the child and the airway for the child to breathe is maintained.

Third Embodiment

Then, a friction unit and a thermochromic writing instrument according to the third embodiment of the present invention is described with reference to FIGS. 13 through 21.

Figure 14:
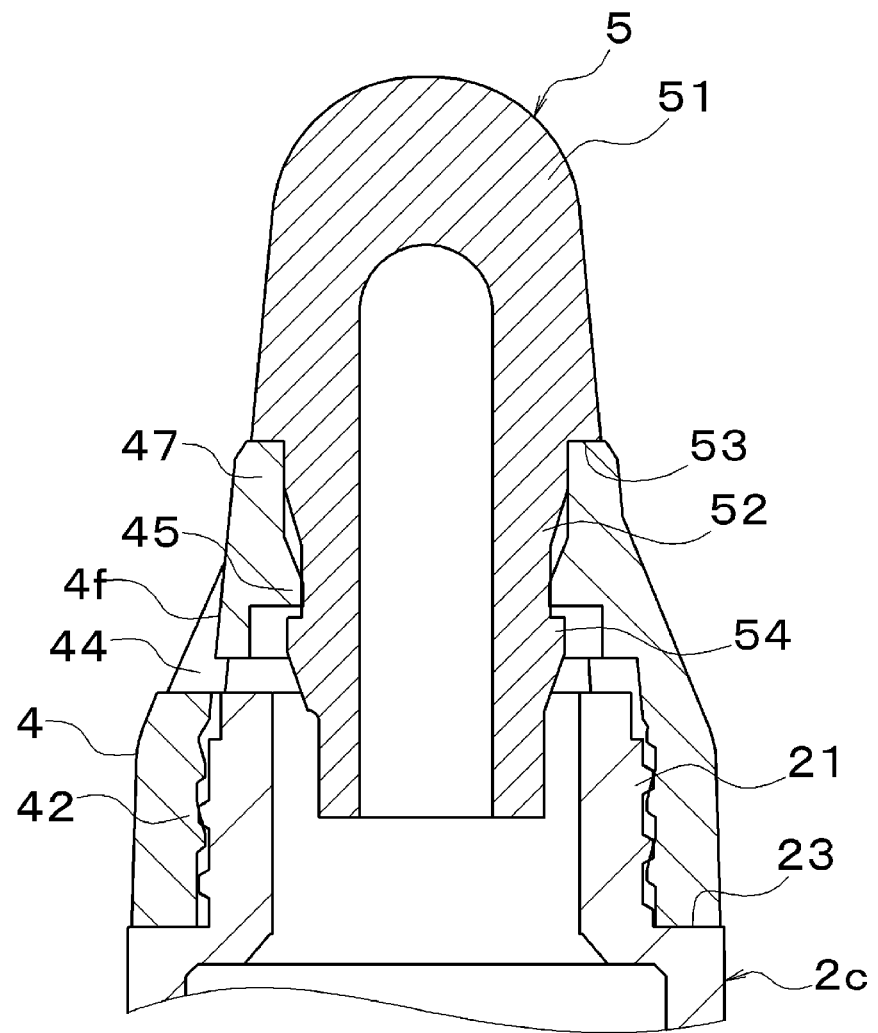
FIG. 14 is a cross-sectional view illustrating a portion including the friction unit and a barrel in FIG. 13.
Figure 15:
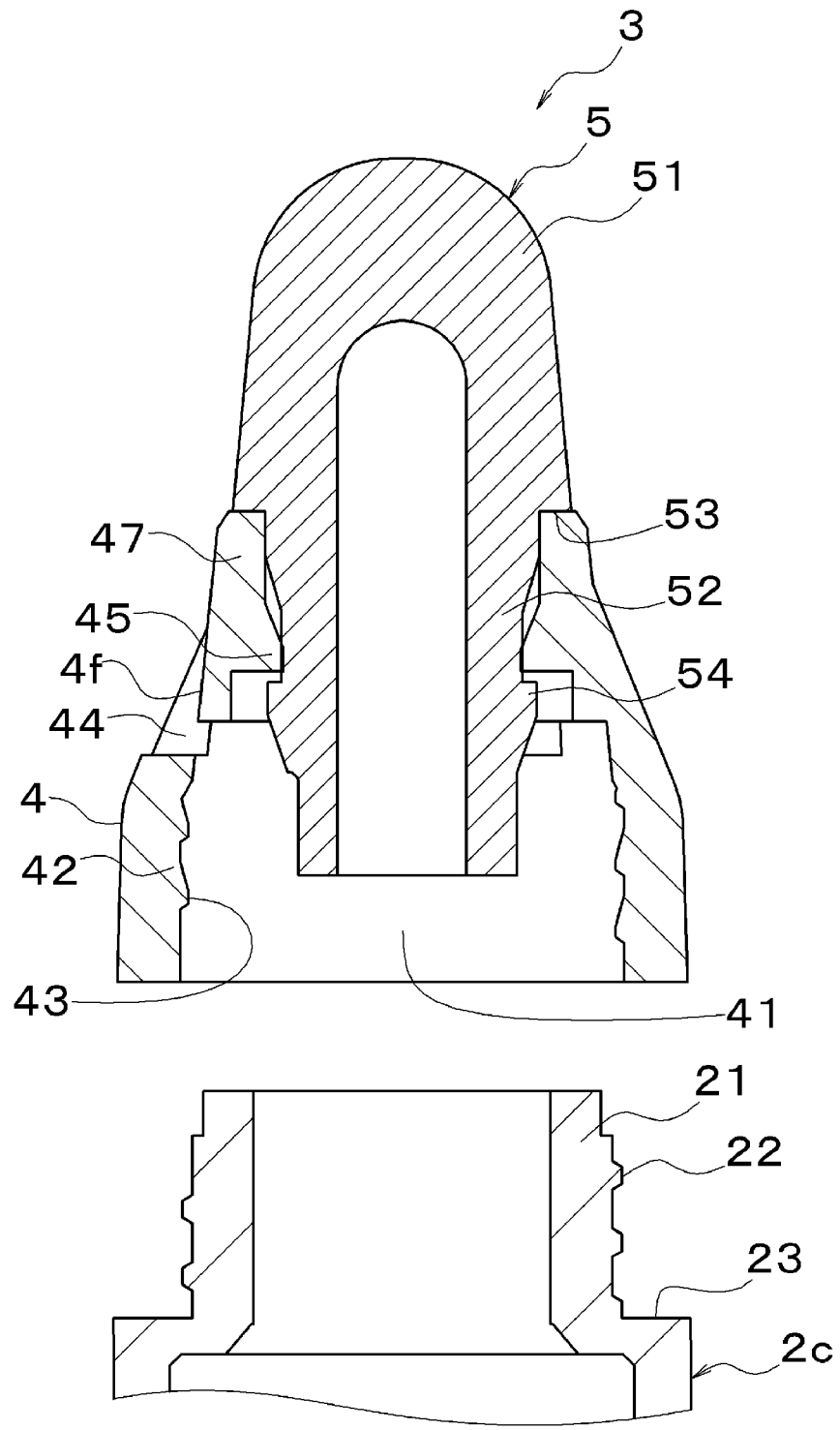
FIG. 15 is a cross-sectional view illustrating a state of exploding the friction unit and the barrel in FIG. 14.

As illustrated in FIGS. 14 and 15, the friction unit 3 and the thermochromic writing instrument 1 in the third embodiment are different from those in the first and second embodiments in the configuration of the retention portion 4 of the friction unit 3. In the friction unit 3 and the thermochromic writing instrument 1 in the third embodiment described below, a detailed description on the configuration identical to that in the first embodiment is omitted.

Barrel

As illustrated in FIG. 13, the barrel 2 of the thermochromic writing instrument 1 is configured with the lower barrel 2a, the intermediate barrel 2b, and the upper barrel 2c. Most of the lower barrel 2a is configured with a cylindrical portion. The cylindrical portion has a lower end side provided with a tapered portion with an outer diameter decreasing downward from the top. The cylindrical portion of the lower barrel 2a is used as a grip for the thermochromic writing instrument 1. The lower barrel 2a is provided with an opening at the distal end of the tapered portion. A pen point of a refill projects and retracts from an opening at the distal end of the tapered portion. The intermediate barrel 2b is configured only with a long cylindrical portion. The lower end portion of the intermediate barrel 2b is connected to the upper end portion of the lower barrel 2a by screwing or press fitting. The upper barrel 2c is configured only with a short cylindrical portion. The lower end portion of the upper barrel 2c is connected to the upper end portion of the intermediate barrel 2b by screwing or press fitting. The lower barrel 2a, the intermediate barrel 2b, and the upper barrel 2c are formed by metal or a synthetic resin, such as polycarbonate, for example.

As illustrated in FIGS. 14 and 15, the tubular upper barrel 2c has an upper end portion provided with the first connecting portion 21 projecting upward in a tubular shape. The first connecting portion 21 has an outer surface provided with the external thread 22. The first connecting portion 21 is screwed to the second connecting portion 42 provided in the retention portion 4 of the friction unit 3. It should be noted that the connection between the first connecting portion 21 and the second connecting portion 42 is not limited to screwing and may be altered to a connection structure, such as fitting, press fitting, and engagement, for example.

The first connecting portion 21 has an outer diameter smaller than the outer diameter at the upper end of the upper barrel 2c. With this configuration, at the upper end of the upper barrel 2c, an annular step portion 23 is formed. The annular step portion 23 has surface contact with the lower end of the retention portion 4 of the friction unit 3.

Friction Unit

FIGS. 14 through 21 illustrate the friction unit 3 in the third embodiment. As illustrated in FIG. 14, the friction unit 3 is configured with the retention portion 4 and the friction piece 5. The friction unit 3 is mounted to the upper barrel 2c of the barrel 2 described above. The friction unit 3 in the third embodiment has a height of, for example, 15.0 mm.

Retention Portion

As illustrated in FIGS. 15 through 20, the retention portion 4 has the upper portion 47 to which the friction piece 5 is attached. The retention portion 4 is formed by metal or a synthetic resin, such as polycarbonate, for example. The retention portion 4 in the third embodiment has an axial total length of, for example, 9.0 mm.

As illustrated in FIG. 15, the retention portion 4 has the tubular side wall forming the internal space 41 opening upward and downward. The retention portion 4 has a lower side provided with the second connecting portion 42. The second connecting portion 42 has an inner surface provided with an internal thread 43. The internal thread 43 is screwed to the external thread 22 of the first connecting portion 21 of the barrel 2. It should be noted that the connection between the first connecting portion 21 and the second connecting portion 42 is not limited to screwing and may be altered to a connection structure, such as fitting, press fitting, and engagement, for example.

The friction piece 5 is attached to the upper portion 47 of the retention portion 4. The upper portion 47 has an inner surface provided with the annular inward projection 45. Meanwhile, the friction piece 5 has an outer surface on the lower side provided with the annular outward projection 54. When the lower side of the friction piece 5 is inserted into the upper portion 47 of the retention portion 4, the inward projection 45 is locked to the outward projection 54. It should be noted that the connection between the retention portion 4 and the friction piece 5 is not limited to the locking between the inward projection 45 and the outward projection 54 and may be fitting, press fitting, engagement, screwing, adhesion, double injection molding, and the like.

The annular inward projection 45 has an inclined surface with an inner diameter decreasing downward from the top and an annular lower surface. The inclined surface of the inward projection 45 guides the lower side of the friction piece 5 inserted into the upper portion 47 of the retention portion 4 to the lower part of the internal space 41. This configuration allows smooth locking of the outward projection 54 to the inward projection 45 and facilitates assembly of the friction unit 3.

Figure 16:
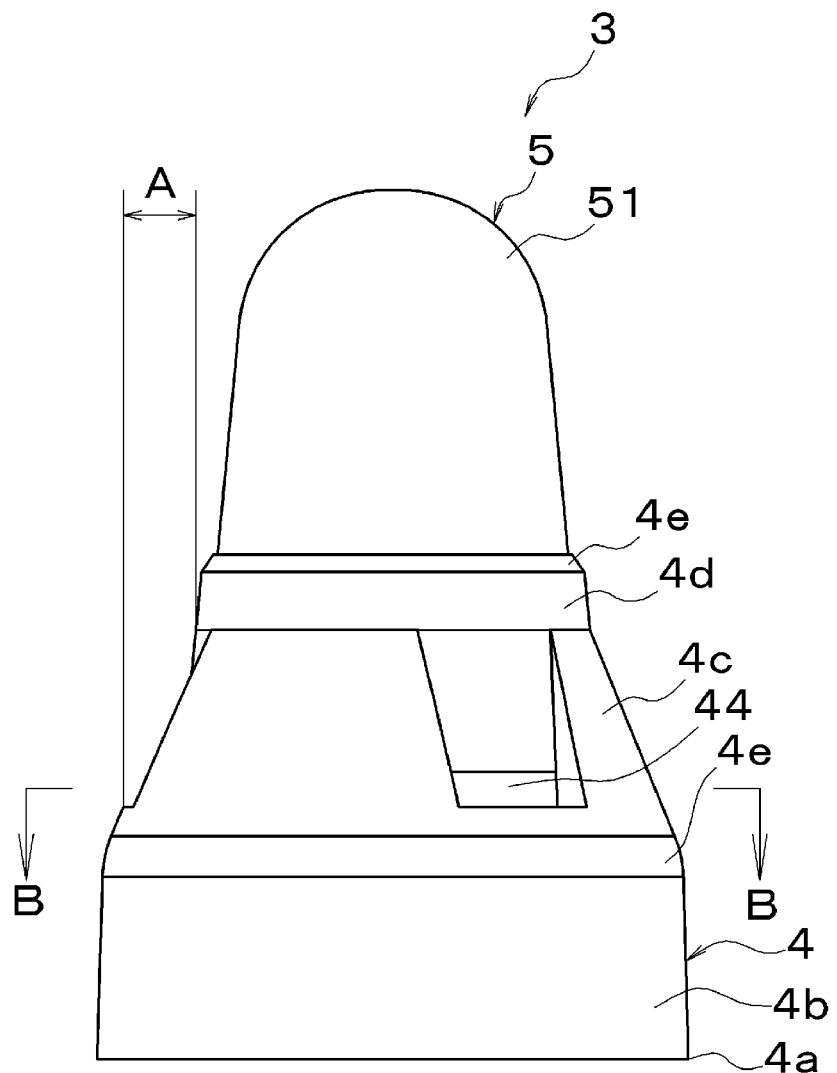
FIG. 16 is a front view illustrating the friction unit.
Figure 19:
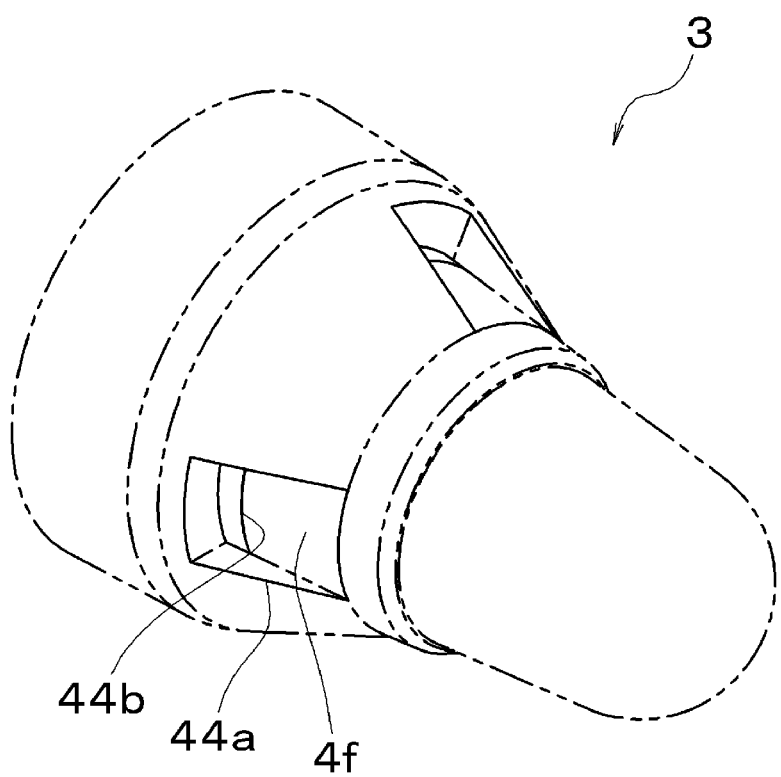
FIG. 19 is a perspective view illustrating a vent hole of the friction unit.
Figure 20:
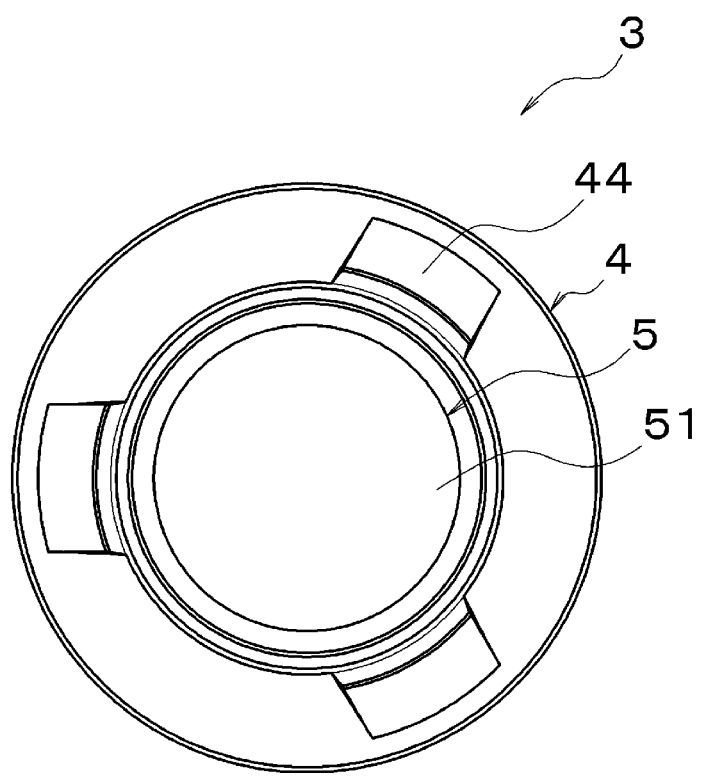
FIG. 20 is a plan view illustrating the friction unit.

As illustrated in FIGS. 15, 16, and 20, in the retention portion 4, three vent holes 44 are formed. The three vent holes 44 are arranged at regular intervals in the tubular side wall of the retention portion 4 to communicate with the internal space 41 of the retention portion 4. If a child swallows the friction unit 3 by mistake, the vent holes 44 function as an air channel for the child to breathe. In addition, the first opening 44*a* (refer to FIG. 19) of the vent holes 44 formed on the outer surface of the retention portion 4 functions as an antislip for fingers holding the friction unit 3. This configuration facilitates attachment and detachment of the friction unit 3 to and from the barrel 2.

Figure 17:
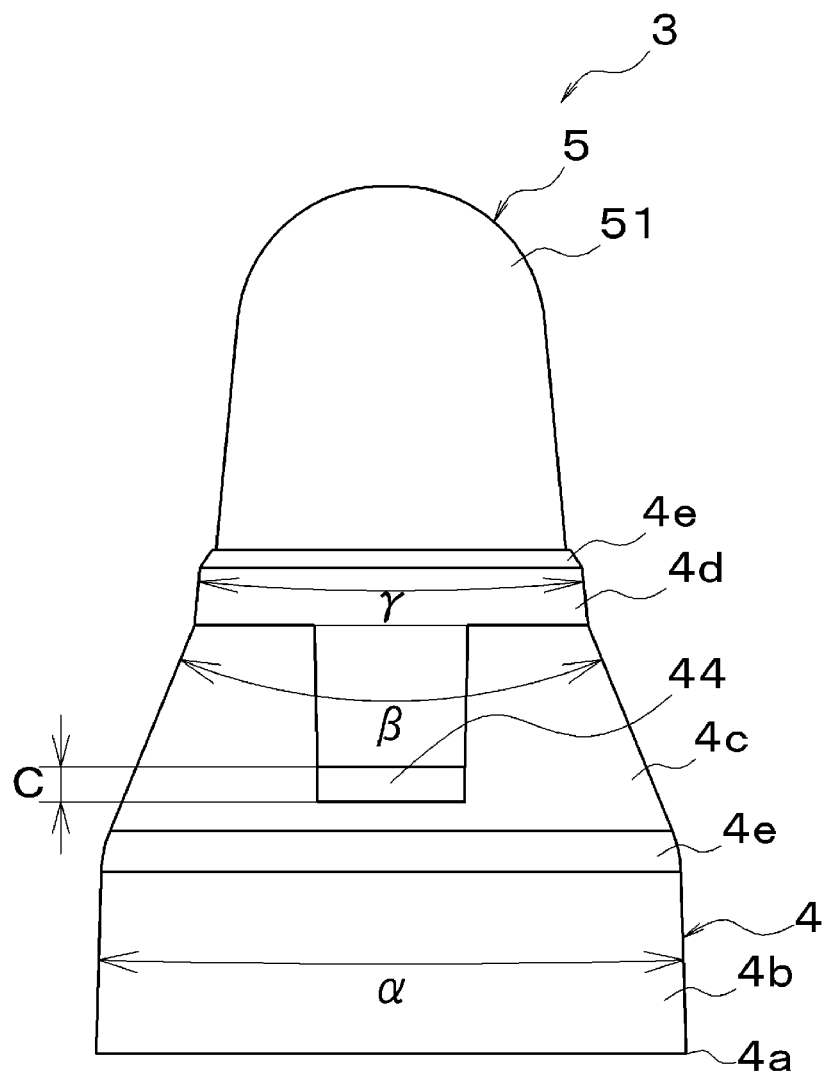
FIG. 17 is a left side view illustrating the friction unit.

Moreover, as illustrated in FIG. 17, the retention portion 4 has an outer surface provided with three tapered portions 4*b*, 4*c*, and 4*d* with different inclination angles α, β, and γ. All the three tapered portions 4*b*, 4*c*, and 4*d* have the inclination angles α, β, and γ of less than 45°, thereby facilitating holding with fingers at any position on the side wall of the retention portion 4. This configuration facilitates attachment and detachment of the friction unit 3 to and from the barrel 2. It should be noted that an antislip, such as a concave groove and a knurl, may be formed on the outer surface of the side wall of the retention portion 4 except the vent holes 44.

As illustrated in FIGS. 15 and 19, the vent holes 44 has the first opening 44*a* formed on the outer surface of the side wall of the retention portion 4 and the second opening 44*b* formed on the inner surface of the side wall of the retention portion 4. The entire vent holes 44 are located above the second connecting portion 42 and the second opening 44*b* of the vent holes 44 is located below the inward projection 45. With this configuration, the vent holes 44 penetrate the side wall of the retention portion 4 without interfering with the second connecting portion 42 and the inward projection 45. That is, the penetration of the vent holes 44 into the side wall of the retention portion 4 does not inhibit the functions of the second connecting portion 42 and the inward projection 45. As a result, the second connecting portion 42 is capable of being securely screwed to the first connecting portion 21 and the inward projection 45 is capable of being securely locked to the outward projection 54.

As illustrated in FIGS. 16 and 19, the first opening 44*a* of the vent holes 44 is formed on an inclined surface with an outer diameter decreasing upward from the bottom of a second tapered portion 4*c*. Thus, there is a diameter difference A illustrated in FIG. 16 between the upper end and the lower end of the first opening 44*a* of the vent holes 44. This diameter difference A allows inside the vent holes 44 to be enlarged from the second opening 44*b* to the first opening 44*a*. With this configuration, even if a child swallows the friction unit 3 by mistake, a sufficient amount of air is obtained from the vent holes 44. The diameter difference A illustrated in FIG. 16 is preferably 0.5 mm or more.

Figure 18:
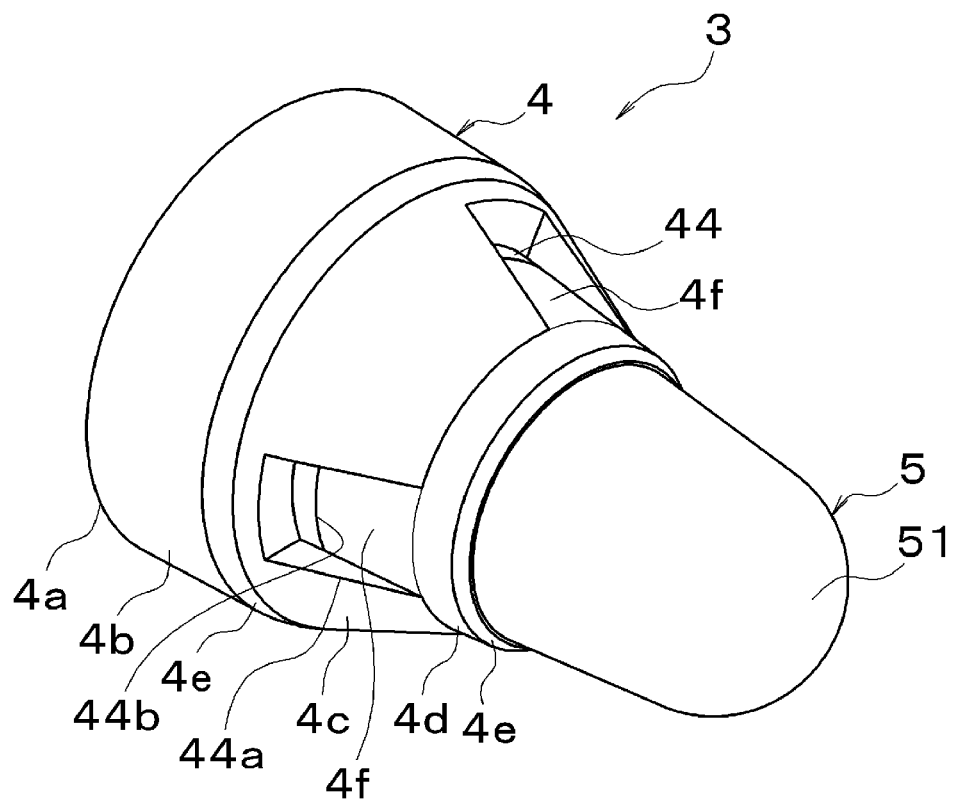
FIG. 18 is a perspective view of the friction unit.

As illustrated in FIGS. 17 and 18, the outer surface of the retention portion 4 is configured with the maximum outer diameter portion 4*a*, the first tapered portion 4*b*, the second tapered portion 4*c*, the third tapered portion 4*d*, and two chamfered portions 4*e*. The first tapered portion 4*b* is located above the maximum outer diameter portion 4*a*. Between the first tapered portion 4*b* and the second tapered portion 4*c*, the first chamfered portion 4*e* is formed. The second tapered portion 4*c* is located above the chamfered portion 4*e*. The third tapered portion 4*d* is located above the second tapered portion 4*c*. The second chamfered portion 4*e* is formed above the third tapered portion 4*d*. It should be noted that, in the third embodiment, the lower end of the first tapered portion 4*b* is the maximum outer diameter portion 4*a* and the maximum outer diameter portion 4*a* does not have an outer surface.

All of the first tapered portion 4*b*, the second tapered portion 4*c*, and the third tapered portion 4*d* have an outer diameter decreasing upward from the bottom. In the third embodiment, the lower end of the first tapered portion 4*b* (same as the maximum outer diameter portion 4*a*) has an outer diameter of 10.2 mm and the upper end of the first tapered portion 4*b* has an outer diameter of 10.0 mm.

The lower end of the second tapered portion 4*c* has an outer diameter of 9.7 mm, and the upper end of the second tapered portion 4*c* has an outer diameter of 6.8 mm. The inclination angle β of the second tapered portion 4*c* is greater than the inclination angle α of the first tapered portion 4*b* (α<β). To facilitate holding of the retention portion 4, the inclination angle γ of the third tapered portion 4*d* is preferably smaller than the inclination angle β of the second tapered portion 4*c* (γ<β). The vent holes 44 are formed in the second tapered portion 4*c*. For example, it is assumed that α=3.2°, β=44°, and γ=11°. It should be noted that the first tapered portion 4*b*, the second tapered portion 4*c* and the third tapered portion 4*d* may be tapered with an extremely small inclination angle, such as a draft to facilitate stripping of a shaped article from the mold. In addition, the end portions as the boundary between the second tapered portion 4*c* and the third tapered portion 4*d* may be chamfered.

Figure 21:
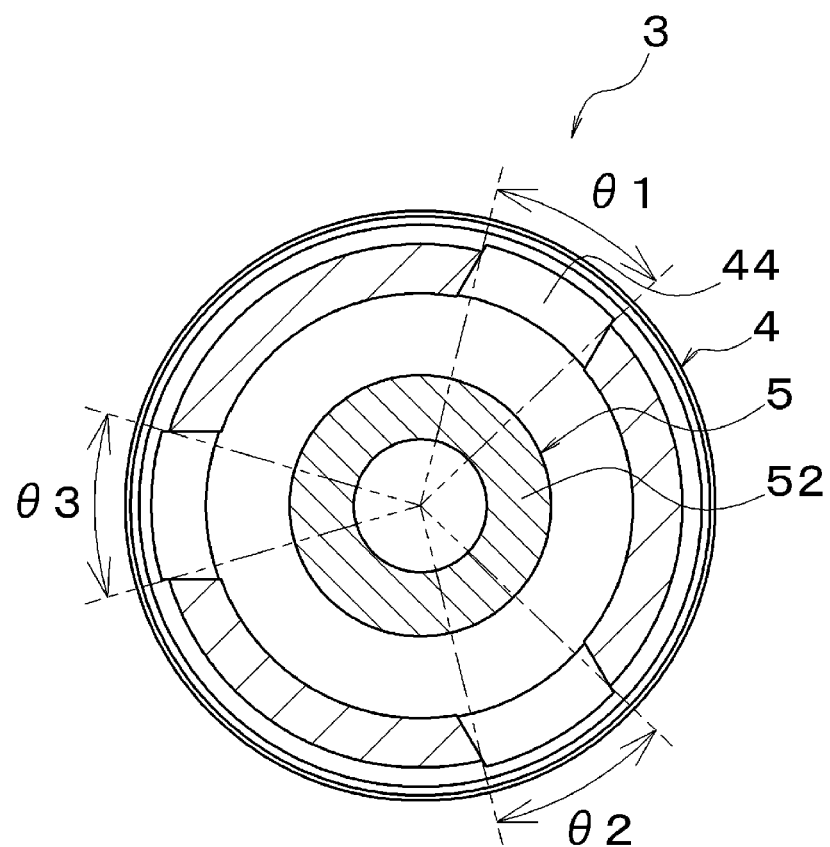
FIG. 21 is a cross-sectional view taken along the line B-B of FIG. 16.

FIG. 21 illustrates the center angles θ1, θ2, and θ3 of the first opening 44*a* of the three vent holes 44. The center angles θ1, θ2, and θ3 of the first opening 44*a* are the angles made by two imaginary lines connecting two end portions located outermost of the first opening 44*a* with the center point of the retention portion 4. The sum total θ (θ=θ1+θ2+θ3) of the center angles θ1, θ2, and θ3 of the first opening 44*a* is preferably in a range of 90° through 180° and more preferably in a range of 90° through 150°. The reason is because the sum total θ of less than 90° does not allow a sufficient quantity of airflow to be obtained and the sum total θ of more than 180° (more preferably 150°) does not allow sufficient strength of the retention portion 4 to be obtained.

FIG. 17 illustrates a height C of the second opening 44*b* of the vent holes 44. The height C of the second opening 44*b* is preferably 0.5 mm or more. This is because the height C of the second opening 44*b* of 0.5 mm or more allows a sufficient quantity of airflow to be obtained if a child swallows the friction unit 3 by mistake.

As illustrated in FIGS. 15 and 18, in the third embodiment, a side wall portion 4*f* extending from the upper end of the first opening 44*a* of the vent holes 44 to the upper end of the second opening 44*b* has a fixed outer diameter. The side wall portion 4*f* has an outer diameter same as the outer diameter of the upper end of the first opening 44*a*. Such a side wall portion 4*f* causes an outer diameter of a portion above the upper end of the second opening 44*b* of the vent holes 44 in the side wall of the retention portion 4 to be equal to or smaller than the outer diameter of the upper end of the second opening 44*b*. With this configuration, in the case that a child swallows the friction unit by mistake, the portion above the upper end of the second opening of the vent holes does not contact the wall of the trachea of the child. As a result, a larger gap is formed between the portion above the upper end of the second opening of the vent holes and the wall of the trachea of the child, and the airway for the child to breathe is maintained.

In addition, the outer diameter of the portion above the upper end of the second opening 44b of the vent holes 44 being equal to or smaller than the outer diameter of the upper end of the second opening 44b means no undercut is formed in the vent holes 44 for molding the outer shape of the retention portion 4 with a mold. This configuration allows the outer shape of the retention portion 4 to be injection molded with a single non-split mold, which does not require a slide core to form the vent holes 44. As a result, the cost for injection molding the retention portion 4 is reduced.

Mounting State of Friction Unit

As illustrated in FIGS. 14 and 15, the friction unit 3 is attachable to and detachable from the upper barrel 2c of the thermochromic writing instrument 1. As illustrated in FIG. 14, when the friction unit 3 is mounted to the upper barrel 2c, the lower end of the retention portion 4 abuts on the step portion 23 of the upper barrel 2c. It should be noted that, same as the second embodiment described above, the upper barrel 2c in the third embodiment may be configured to be provided with the internal thread 22 and the retention portion 4 to be provided with the external thread 43.

Action and Effect

In the friction unit 3 of the third embodiment described above, the vent holes 44, the internal space 41, and the downward opening of the internal space 41 form an air channel to communicate with inside and outside the retention portion 4. This air channel allows, even if a child swallows the friction unit 3 by mistake, the airway for the child to breathe to be maintained. In particular, use of the internal space 41 and the downward opening as the air channel allows sufficient airflow. Since such an air channel is formed inside from the outer surface of the side wall of the retention portion 4, the degree of freedom in the design of the retention portion 4 is not limited. Accordingly, the configuration in the third embodiment improves the degree of freedom in the design of the friction unit 3 and the thermochromic writing instrument 1.

In the friction unit 3 in the third embodiment, the first opening 44a of the vent holes 44 is located in the portion with a smaller outer diameter than that of the maximum outer diameter portion 4a in the tubular side wall of the retention portion 4. With this configuration, if a child swallows the friction unit 3 by mistake, the maximum outer diameter portion 4a of the side wall of the retention portion 4 contacts the wall of the trachea of the child and the portion with a smaller outer diameter than that of the maximum outer diameter portion 4a does not contact the wall of the trachea of the child. As a result, the first opening 44a of the vent holes 44 is not closed by the wall of the trachea of the child and the airway for the child to breathe is maintained.

In the friction unit 3 in the third embodiment, the first opening 44a of the vent holes 44 is formed in the second tapered portion 4c with an outer diameter decreasing upward from the bottom. With this configuration, if a child swallows the friction unit 3 by mistake, the maximum outer diameter portion 4a of the side wall of the retention portion 4 contacts the wall of the trachea of the child and the portion with a smaller outer diameter than that of the maximum outer diameter portion 4a does not contact the wall of the trachea of the child. As a result, the first opening 44a of the vent holes 44 is not closed by the wall of the trachea of the child and the airway for the child to breathe is maintained.

The side wall of the retention portion 4 of the friction unit 3 in the third embodiment includes the maximum outer diameter portion 4a, the first tapered portion 4b, and the second tapered portion 4c. The second tapered portion 4c has an outer diameter smaller than the outer diameter of the first tapered portion 4b and the inclination angle β greater than the inclination angle α of the first tapered portion 4b. The first opening 44a of the vent holes 44 is formed in the second tapered portion 4c. With this configuration, if a child swallows the friction unit 3 by mistake, the second tapered portion 4c does not contact the wall of the trachea of the child even if the friction unit 3 is tilted and the first tapered portion 4b contacts the wall of the trachea of the child. As a result, the first opening 44a of the vent holes 44 is not closed by the wall of the trachea of the child and the airway for the child to breathe is maintained.

In the friction unit 3 of the third embodiment, the outer diameter of the portion above the upper end of the second opening 44b of the vent holes 44 is equal to or smaller than the outer diameter of the upper end of the second opening 44b. Thus, no undercut is formed in the vent holes 44 for molding the outer shape of the retention portion 4 with a mold. This configuration allows the outer shape of the retention portion 4 to be injection molded with a single non-split mold, which does not require a slide core to form the vent holes 44. As a result, the cost for injection molding the retention portion 4 is reduced.

In the thermochromic writing instrument 1 in the third embodiment, the annular outward projection 54 is locked to the annular inward projection 45 in the range of 360 degrees, thereby firmly retaining the attachment portion 52 of the friction piece 5 in the internal space 41 of the retention portion 4. Moreover, in the state where the outward projection 54 is locked to the inward projection 45, a gap is formed between the outer surface of the outward projection 54 and inner surface of the retention portion 4. This gap communicates with the vent holes 44, thereby maintaining the air channel to communicate with inside and outside the retention portion 4.

In addition, the air channel of the friction unit 3 exhibits the function if a child swallows a friction unit 3 removed from the thermochromic writing instrument 1 by mistake. Meanwhile, in the state where the friction unit 3 is mounted to the thermochromic writing instrument 1, the air channel of the friction unit 3 does not exhibit the function at all. Upon this, the third embodiment is configured to store the first connecting portion 21 of the thermochromic writing instrument 1 in the gap constituting part of the air channel of the friction unit 3 and is capable of effectively using this gap.

Fourth Embodiment

Then, a friction unit and a thermochromic writing instrument according to the fourth embodiment of the present invention is described with reference to FIG. 22.

Figure 22:
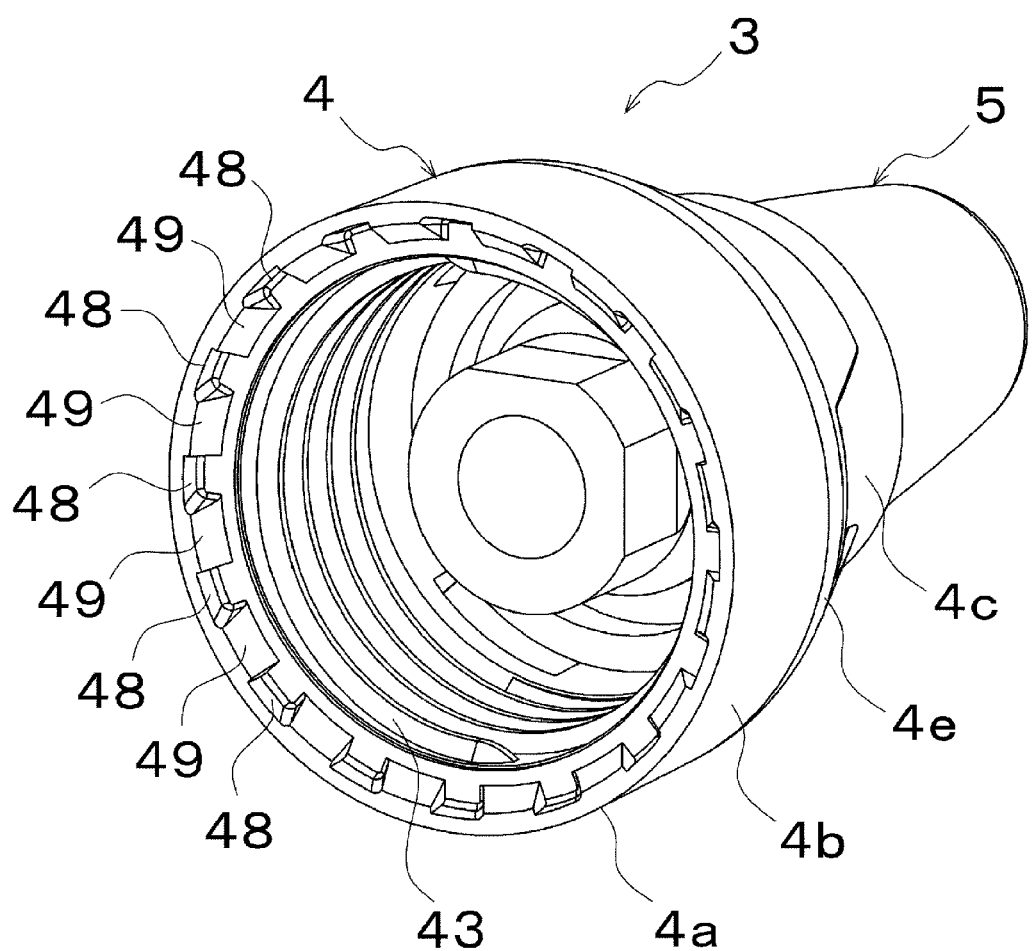
FIG. 22 is a perspective view illustrating a friction unit according to a fourth embodiment of the present invention.

As illustrated in FIG. 22, the friction unit 3 in the fourth embodiment has a plurality of concave portions 48 formed along the lower end of the tubular side wall of the retention portion 4. The plurality of concave portions 48 are formed on the inner surface in the lower end of the retention portion 4. With this configuration, the lower end of the retention portion 4 is in a shape where the plurality of concave portions 48 and convex portions 49 alternately continue. It should be noted that the plurality of concave portions 48 and convex portions 49 may be formed on the outer surface of the lower end of the retention portion 4. In the fourth embodiment, the configuration other than the concave portions 48 and convex portions 49 is identical to the friction unit 3 and the thermochromic writing instrument 1 illustrated in FIGS. 13 through 21.

Action and Effect

Firstly, the plurality of concave portions 48 are used to maintain the position of the retention portion 4 in an automated assembly procedure of the friction unit 3. That is, the plurality of concave portions 48 are locked to the plurality of convex portions 49 formed in a jig, not shown. This configuration limits movement and rotation of the retention portion 4 and allows the friction piece 5 to be readily assembled to the retention portion 4.

Secondly, the plurality of concave portions 48 inhibit firm joining of the retention portion 4 to the barrel 2 of the thermochromic writing instrument 1. That is, the friction unit 3 is mounted to the first connecting portion 21 of the upper barrel 2c illustrated in FIG. 15. In this situation, the lower end of the side wall of the retention portion 4 has surface contact with the annular step portion 23 of the upper barrel 2c. If the pressure on the surface contact is high and the contact area is large, the lower end of the side wall of the retention portion 4 is sometimes firmly joined to the step portion 23 of the upper barrel 2c and causes the friction unit 3 not removable by hand. The plurality of concave portions 48 reduce the area of the lower end of the side wall of the retention portion 4 and facilitate removal of the friction unit 3 by hand.

In addition, the plurality of concave portions 48 accept foreign substances, such as dust and dirt, present between the lower end of the side wall of the retention portion 4 and the step portion 23 of the upper barrel 2c not to cause the foreign substances to inhibit mounting of the friction unit 3. Moreover, a plurality of convex portions, not shown, may be formed on the step portion 23 of the upper barrel 2c. When the friction unit 3 is mounted to the upper barrel 2c, the plurality of concave portions 48 are locked to the plurality of convex portions formed in the step portion 23 to limit rotation of the retention portion 4. With this configuration, the screwing of the first connecting portion 21 and the second connecting portion 42 illustrated in FIG. 14 is maintained and the friction unit 3 is not separated from the upper barrel 2c unintentionally.

Others

The configuration of the friction unit and the thermochromic writing instrument of the present invention is not limited to the first through fourth embodiments described above. For example, the friction unit is not limited to the retractable thermochromic writing instrument and is applicable to a capped thermochromic writing instrument. In this case, the friction unit is mounted to an end portion of the cap opposite to the opening. In addition, the thermochromic writing instrument to which the friction unit is applied is not limited to a ball-point pen. The friction unit is applicable to thermochromic writing instruments other than ball-point pens, such as pencils and markers, for example.

DESCRIPTION OF REFERENCE NUMERALS

1 Thermochromic Writing Instrument
2 Barrel
2a Lower Barrel
2b Intermediate Barrel
2c Upper Barrel
2d Clip
21 First Connecting Portion
22 External Thread, Internal Thread
23 Step Portion
24 Enlarged Diameter Portion
3 Friction Unit
4 Retention Portion
41 Internal Space
42 Second Connecting Portion
43 Internal Thread, External Thread
44 Vent Hole
44a First Opening
44b Second Opening
45 Inward Projection
46 Step Portion
47 Upper Portion
48 Concave Portion
49 Convex Portion
4a Maximum Outer Diameter Portion
4b First Tapered Portion
4c Second Tapered Portion
4d Third Tapered Portion
4e Chamfered Portion
4f A Side Wall Portion
5 Friction Piece
51 Friction Portion
52 Attachment Portion
53 Step Portion
54 Outward Projection

The invention claimed is:

1. A friction unit, comprising a friction piece and a retention portion, the friction piece being configured to allow generation of frictional heat to cause handwriting in thermochromic ink to undergo a thermochromic change and the retention portion being configured to allow retention of the friction piece and attachment to and detachment from a barrel or cap of a thermochromic writing instrument, wherein
   the retention portion has a tubular side wall forming an internal space opening at least downward,
   the side wall has at least one vent hole formed to communicate with the internal space, and
   air is allowed to flow between the vent hole, the internal space, and the downward opening,
   the tubular side wall of the retention portion includes a portion with a large outer diameter and a portion with a small outer diameter, and
   the vent hole has a first opening formed on an outer surface of the side wall and a second opening formed on an inner surface of the side wall and at least the first opening is located above a maximum outer diameter portion of the side wall, and
   at least part of the tubular side wall of the retention portion is provide with a tapered portion with an outer diameter decreasing upward from bottom and the first opening of the vent hole is formed in the tapered portion.

2. The friction unit according to claim 1, wherein the tapered portion includes a first tapered portion located above the maximum outer diameter portion and a second tapered portion located above the first tapered portion, the first tapered portion has an outer diameter decreasing upward from an upper end of the maximum outer diameter portion and the second tapered portion has an outer diameter decreasing upward from an upper end of the first tapered portion, the second tapered portion has an inclination angle greater than an inclination angle of the first tapered portion, and the first opening of the vent hole is formed in the second tapered portion.

3. The friction unit according to claim 1, wherein, in the tubular side wall of the retention portion, a portion above an upper end of the second opening of the vent hole has an outer diameter equal to or smaller than an outer diameter of the upper end of the second opening.

4. The friction unit according to claim 1, wherein
an annular outward projection is provided on an outer surface on a lower side of the friction piece,
an annular inward projection is provided on the inner surface of the tubular side wall of the retention portion and the side wall opens downward and upward,
at least the second opening of the vent hole is located below the inward projection,
in a state where the lower side of the friction piece is inserted into the internal space from the upward opening of the side wall, the outward projection is locked to the inward projection, and
in a state where the outward projection is locked to the inward projection, a gap is formed between an outer surface of the outward projection and an inner surface of the side wall and the gap communicates with the vent hole.

5. A thermochromic writing instrument comprising the friction unit according to claim 4, wherein
the thermochromic writing instrument includes at least one of a barrel or cap,
the barrel or cap is provided with a first connecting portion,
the friction unit is provided with a second connecting portion configured to allow attachment to and detachment from the first connecting portion, and
when the second connecting portion is connected to the first connecting portion, the first connecting portion is located in the gap formed between the outer surface of the outward projection and the inner surface of the side wall.

6. The friction unit according to claim 1, wherein a plurality of concave portions are formed along a lower end of the tubular side wall of the retention portion.

7. A thermochromic writing instrument comprising the friction unit according to claim 1, wherein
the thermochromic writing instrument at least one of a barrel or cap,
the barrel or cap is provided with a first connecting portion, and
the friction unit is provided with a second connecting portion configured to allow attachment to and detachment from the first connecting portion.

* * * * *

UNITED STATES PATENT AND TRADEMARK OFFICE
CERTIFICATE OF CORRECTION

PATENT NO. : 12,179,510 B2
APPLICATION NO. : 18/280984
DATED : December 31, 2024
INVENTOR(S) : Hisatoshi Hayakawa Page 1 of 1

It is certified that error appears in the above-identified patent and that said Letters Patent is hereby corrected as shown below:

In the Claims

Column 24, Line 37, Claim 1, after "space," delete "and"

Column 24, Line 49, Claim 1, delete "provide" and insert -- provided --

Column 26, Line 16, Claim 7, after "instrument" insert -- includes --

Signed and Sealed this
Fourth Day of March, 2025

Coke Morgan Stewart
*Acting Director of the United States Patent and Trademark Office*